United States Patent
Payne et al.

[15] 3,665,280
[45] May 23, 1972

[54] ZERO OFFSET NUMERICAL SERVO MACHINE CONTROL SYSTEM

[72] Inventors: Robert A. Payne, Des Plaines; John F. Van Der Molen, Elmhurst, both of Ill.

[73] Assignee: Stewart-Warner Corporation, Chicago, Ill.

[22] Filed: Aug. 22, 1969

[21] Appl. No.: 852,330

Related U.S. Application Data

[63] Continuation of Ser. No. 560,322, June 24, 1966.

[52] U.S. Cl. ......................... 318/572, 318/603, 235/151.11, 90/13
[51] Int. Cl. ........................................................... G05b 19/24
[58] Field of Search .................. 318/572; 235/151.11; 90/13

[56] References Cited

UNITED STATES PATENTS

| | | | |
|---|---|---|---|
| 3,218,532 | 11/1965 | Toscaho | 318/572 |
| 3,430,035 | 2/1969 | Read | 318/572 X |
| 3,327,101 | 6/1967 | Evans | 318/572 X |
| 3,340,447 | 9/1967 | MacDonald | 318/572 X |
| 3,430,121 | 2/1969 | Yoshitake et al. | 318/572 |
| 3,073,998 | 1/1963 | Bower | 318/572 |
| 2,933,244 | 4/1960 | Tripp | 318/572 X |

*Primary Examiner*—T. E. Lynch
*Attorney*—Augustus G. Douvas, William J. Newman and Norton Lesser

[57] ABSTRACT

A numerical control system for machine tools or the like such as milling machines is disclosed which directs movement by absolute measurement from a reference zero. Programmed data relating to a desired absolute position of the reference zero is entered into a command register, the contents of which is compared bit by bit with data relating to the absolute actual position of the machine tool entered into a position register. The programmed dimension data relates to the actual size of the desired workpiece as provisions are made for entering data relating to tool size offset by means other than the program. A complete system is disclosed including the logic which synchronizes the input of the machine tool actual position with the command position data entered into the system from the programmer as well as the means for controlling the feed speed of the machine tool responsive to programmed data.

11 Claims, 29 Drawing Figures

Patented May 23, 1972

INVENTORS
Robert A. Payne
John F. VanDenMolen

By William J. Newman
Attorney

Patented May 23, 1972  3,665,280

| EOR | | | | |
|---|---|---|---|---|
| N001 G44 | X 01000 | F19 | | EOB |
| N002 G44 | Y-04000 | F09 | | EOB |
| N003 G43 | X 05000 | | | EOB |
| N004 G43 | Y-02000 | | | EOB |
| N005 G43 | X 03000 | | | EOB |
| N006 G43 | Y-01000 | | | EOB |
| N007 | X | | M00/LIFT CUTTER | EOB |
| N008 | X 3000 Y-3000 | F19 | M00/PLUNGER CUTTER | EOB |
| N009 G43 | X 02000 Y-03500 | F09 | | EOB |
| N010 G44 | Y-02500 | | | EOB |
| N011 G44 | X 04000 | | | EOB |
| N012 G43 | Y-03500 | | | EOB |
| N013 G43 | X 02000 | | M00/LIFT CUTTER | |
| N014 | X | Y F19 M00 | | EOB |
| | | M30 | | |

INVENTORS
Robert A. Payne
John F. VanDerMolen

By William J. Moore
Attorney

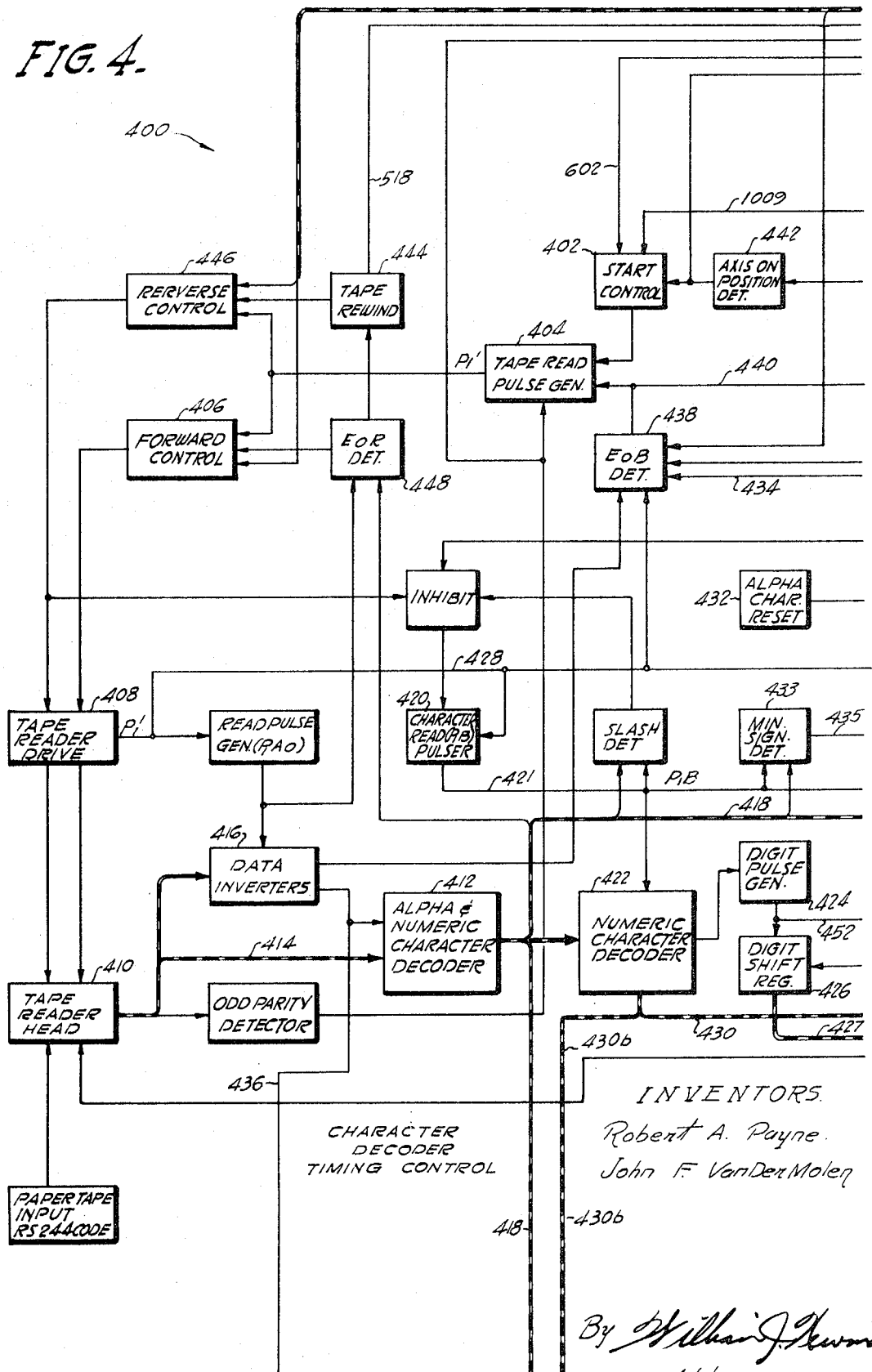

INVENTORS
Robert A. Payne
John F. VanDerMolen

By William J. Newman
Attorney

Patented May 23, 1972

INVENTORS
Robert A. Payne
John F. VanDerMolen

By William J. Kovar
Attorney

INVENTORS
Robert A. Payne
John F. VanDerMolen

Patented May 23, 1972

| FIG. 4. | FIG. 5. | FIG. 6. |
| FIG. 7. | FIG. 8. | FIG. 9. |
| FIG. 10. | FIG. 11. | FIG. 12. |

INVENTORS
Robert A. Payne
John F. VanDerMolen.

By William J. Newman
Attorney

INVENTORS
Robert A. Payne
John F. VanDerMolen

By William J. Newman
Attorney

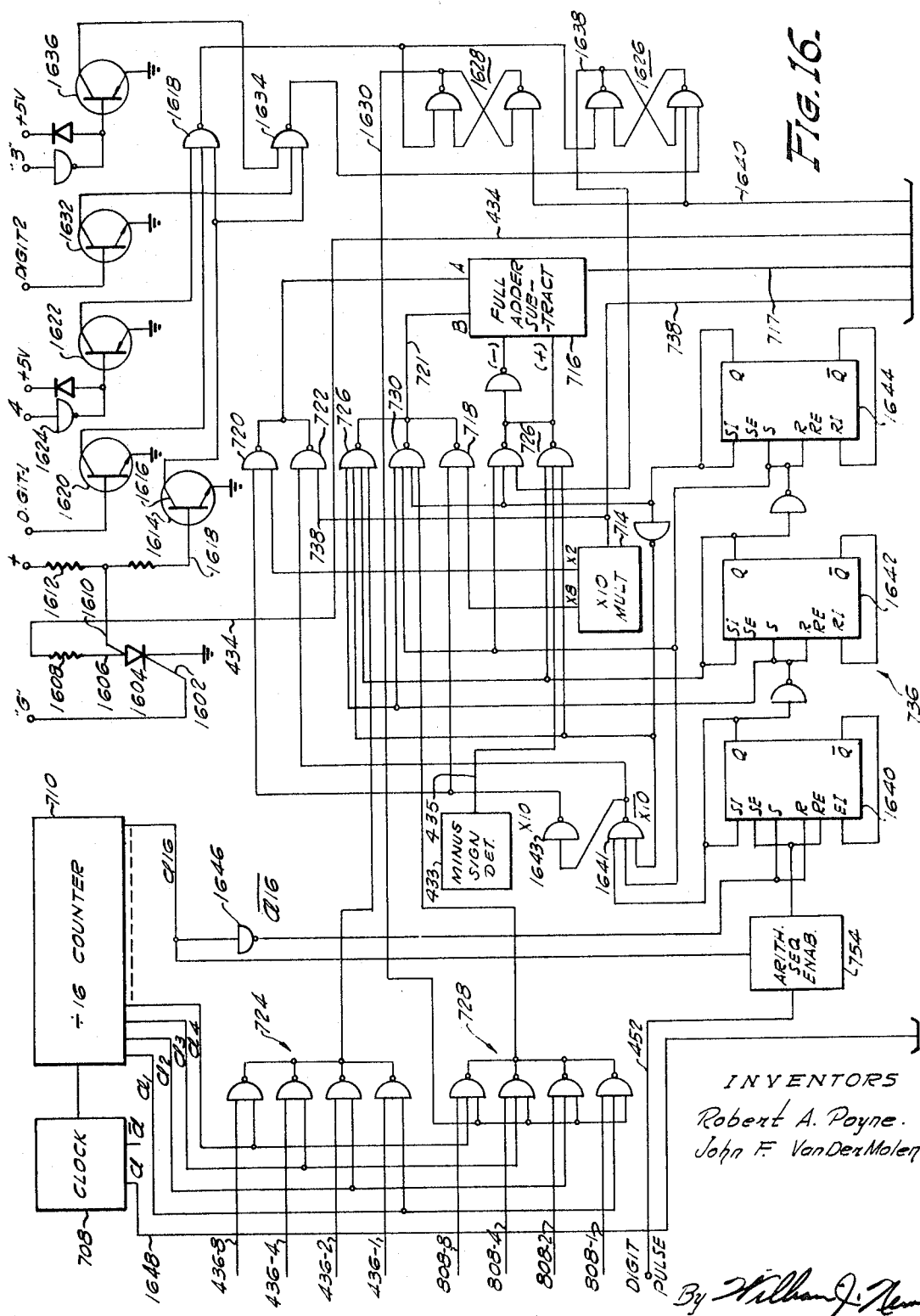

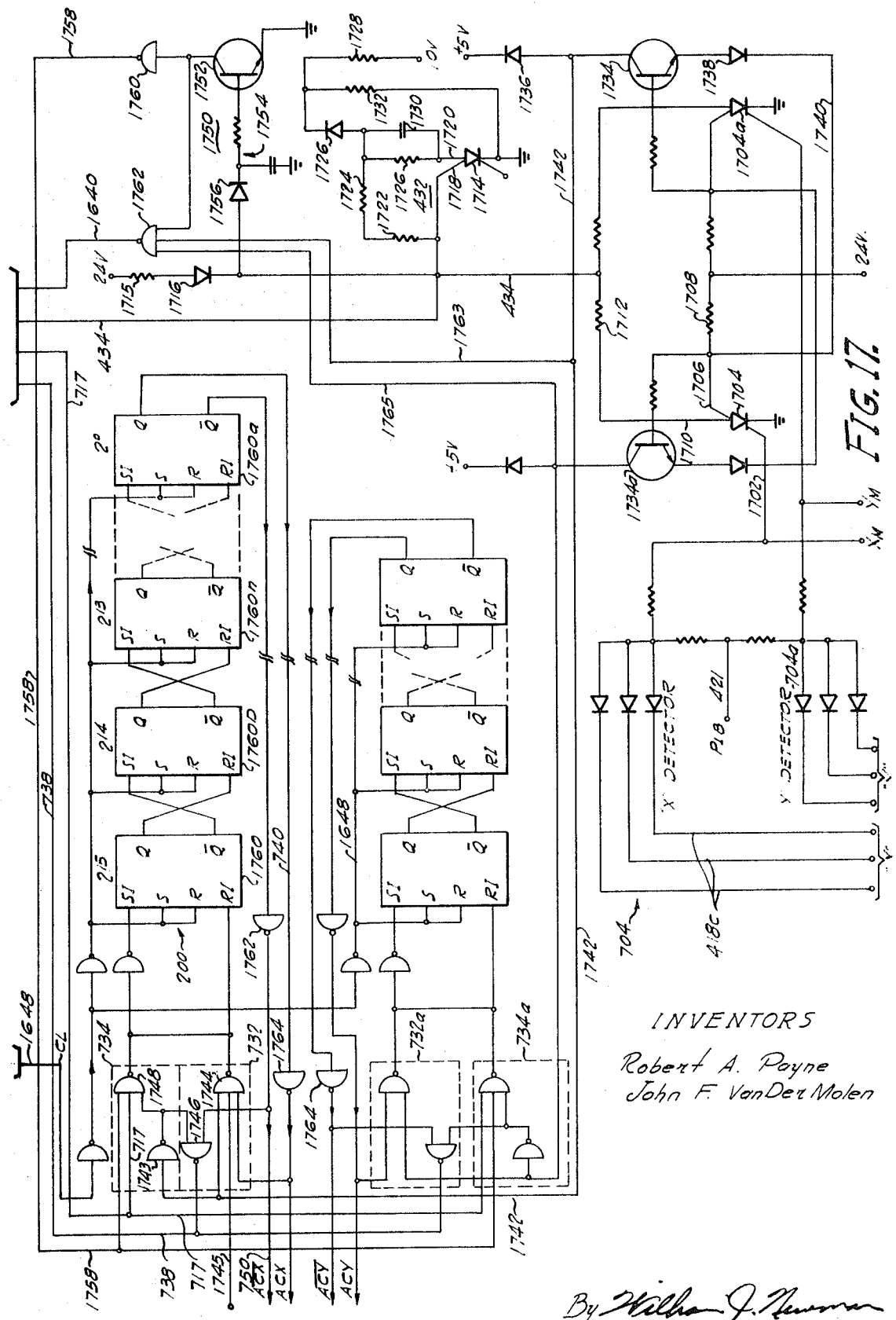

INVENTORS
Robert A. Payne
John F. VanDer Molen

By William J. Newman
Attorney

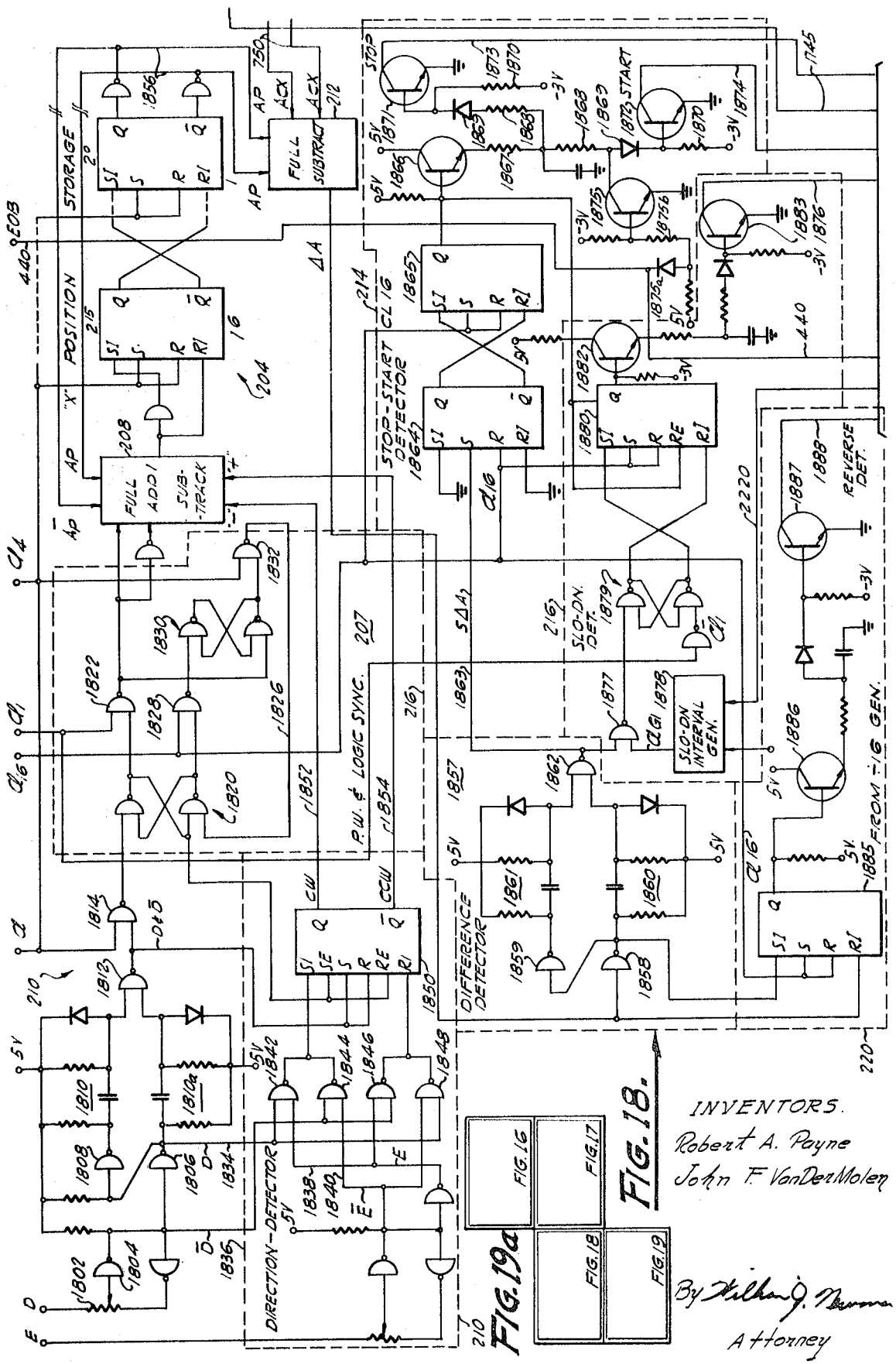

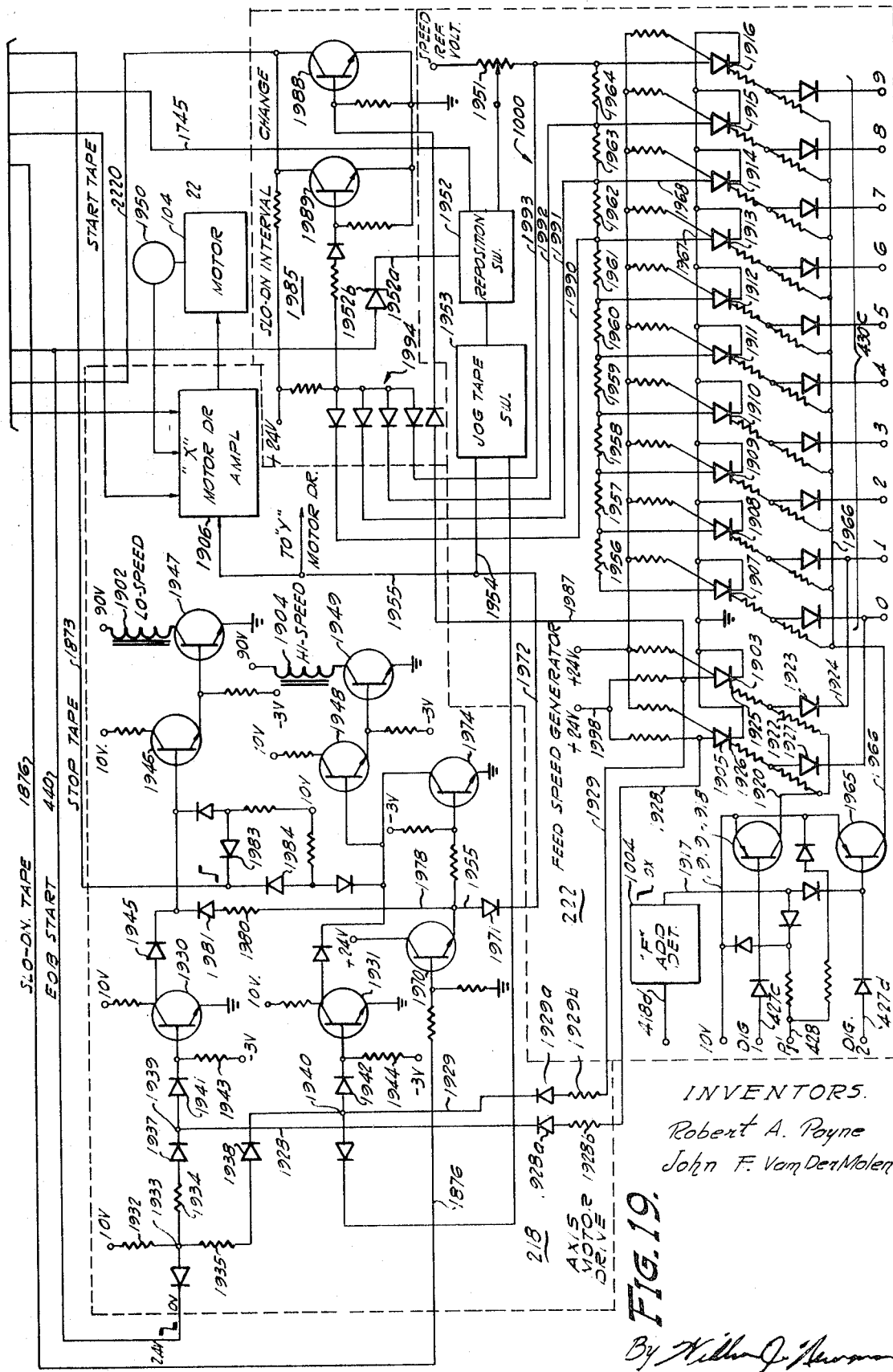

INVENTORS
Robert A. Payne
John F. VanDerMolen

By William J. Newman
Attorney

Patented May 23, 1972

INVENTORS.
Robert A. Payne
John F. VanDerMolen

By William J. Newman
Attorney

INVENTORS
Robert A. Payne
John F. VanDerMolen

By William J. Newman
Attorney

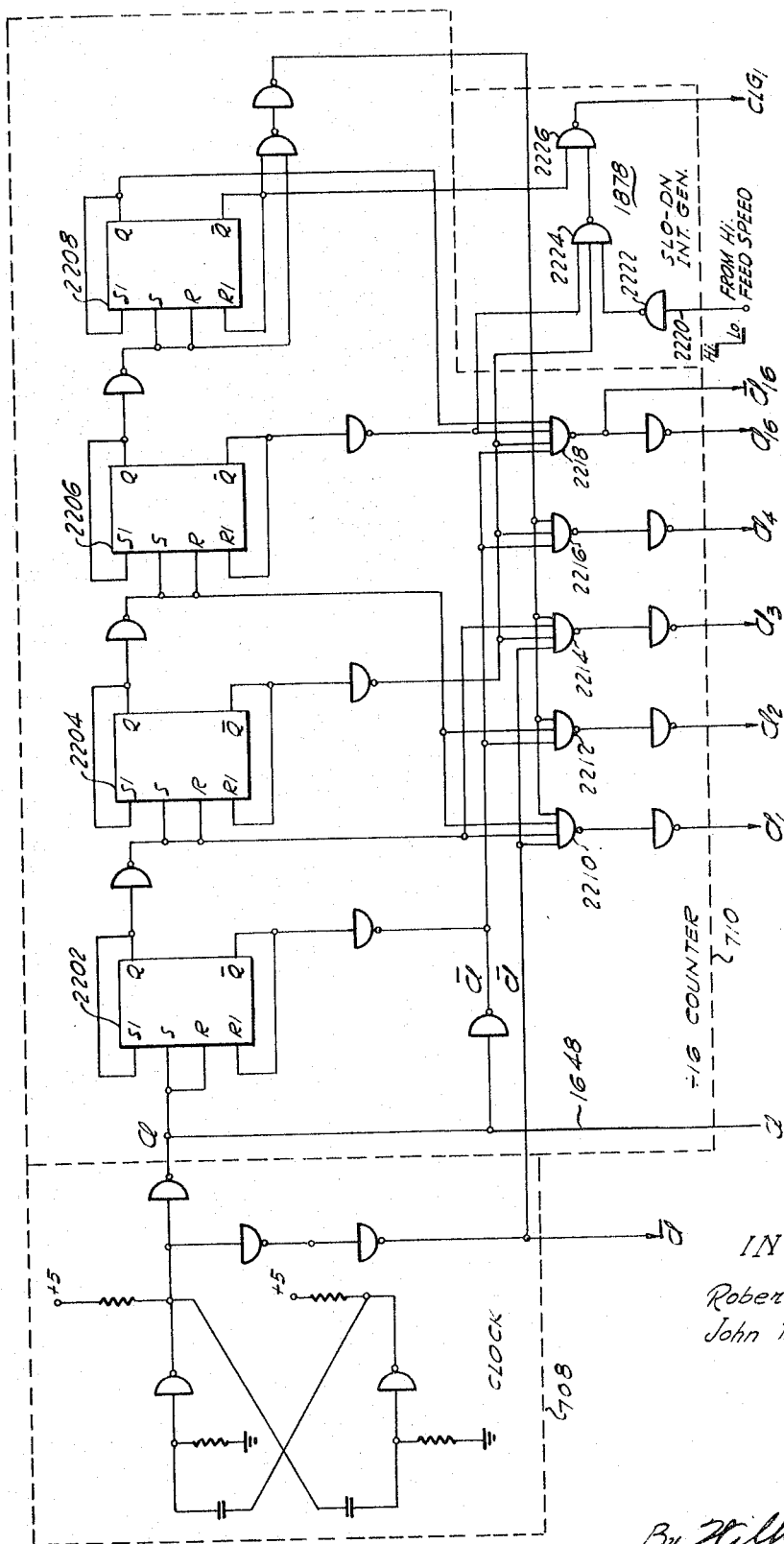

ZERO OFFSET NUMERICAL SERVO MACHINE CONTROL SYSTEM

This application is a continuation of application Ser. No. 560,322, filed June 24, 1966 and relates to control systems and more particularly to control systems for operating machine tools and the like from programmed binary coded input material such as punched tape and magnetic tapes. While the description following hereinafter pertains primarily to milling machines it will be obvious that the inventive concepts herein disclosed are applicable to many other kinds of machinery.

In the development of programmed type control systems for machine tools such as milling machines, provisions must be made to compensate for the offset of the particular tool being used in order to arrive at accurate fabricated workpieces. For example, all milling machine cutters have a finite radius which must be considered if the cutter is being used to shape a surface on the workpiece.

In previous systems, tool offset compensation was provided for in the program input to the machine. That is, the programmer preparing the control tape would calculate the tool offset into each dimension for each step of the operation. The cutter radius would have to be added to or subtracted from the desired dimension, the resultant dimension being programmed on the tape. This, of course, presents serious problems if the size of the cutter is ever changed. A whole new program must be prepared for each different sized cutter being used, and this happens every time a cutter is sharpened. Thus, the cutter has to be discarded prematurely or a variety of tape programs have to be prepared to compensate for the reduction in size of the cutter each time it is sharpened. Some later machines have tried to solve this problem by making provisions for manually reading in to the control program a correction factor for the shrinkage in tool size when it is sharpened. The program tape is prepared with the dimensions for the cutter radius included, and a control is provided at the machine control panel for reading in a correction factor each time the tool is sharpened.

It can be readily observed that these control systems lack a degree of flexibility which are advantageous in such machines. The job of the programmer is still quite difficult because he must calculate the cutter dimension in each program step. In addition each tape is related to a specific tool or a specific, limited range of tools because of the cutter dimensions appearing in the programmed dimensions. A new tape program must be prepared for each change of tool size, at least of substantial portions in order to form a workpiece having the proper finished dimensions.

The present invention provides a control system in which the program data on the tape is related specifically to the actual dimensions of the desired workpiece pattern. The dimension of the tool is not part of the tape program and is read in at the machine control console. The tape program only includes information to the direction of tool offset compensation for each program step. Thus, only one tape need be prepared and used and it is universally applicable for any size tool desired within the machine's capabilities. Each time the tool is sharpened the operator need only change the tool offset setting at the console and continue making pieces.

It is therefore an object of this invention to provide a unique control system for machine tools and the like which are operable from programmed inputs such as punch tapes or magnetic tapes.

It is also an object of this invention to provide a control system which includes a unique manner of compensating for the work tool dimensions.

Another object of this invention is to provide a control system for a machine tool in which the programmed input is prepared with the actual dimensions of the finished part and the direction of tool offset required while the actual dimension of the work tool is separately entered into the control system.

A further object of this invention is to provide a machine control system having tool offset compensation which is highly flexible and adaptable to the use of many different sized tools without changing the programmed input material.

In addition, it is an object of this invention to provide a machine control circuit which is adapted for use of integrated circuits.

Briefly the objects and advantages of this invention are embodied in a machine tool and a control system therefor which comprises means for arithmetically combining data inputs such as an adder-subtractor circuit, means including a manual control such as digit dials for entering data relating to the actual amount of the work tool offset required into the arithmetic combiner, and means for entering data into the arithmetic combiner from a prepared programmed input such as punched tape. The programmed input relates to the actual desired dimension of the workpiece and also includes information relating to the required direction of tool offset. The arithmetic combiner is operable to add or subtract the data in accordance with the required direction of tool offset. The combined data is compared with data relating to the relative position of the work tool and workpiece support in a comparator circuit which causes the driving means to provide the relative movement in accordance with the desired dimension.

This invention will be better understood upon a further reading of this specification especially when taken in view of the accompanying drawings in which:

FIGS. 4 through 12 are schematic block diagrams of the complete control system, the diagrams to be arranged in the manner shown in FIG. 12a;

FIGS. 16 and 17 are schematic diagrams of the Tape Read In Logic circuits;

FIGS. 18 and 19 are schematic diagrams of the Position Logic Control circuits including the slow down, stop, feed speed generator and motor drive functions;

FIG. 19a shows the composite arrangement of FIGS. 16 through 19;

FIG. 22 is a schematic diagram of the Clock and the Divide-by-Sixteen Counter.

Figure 1:
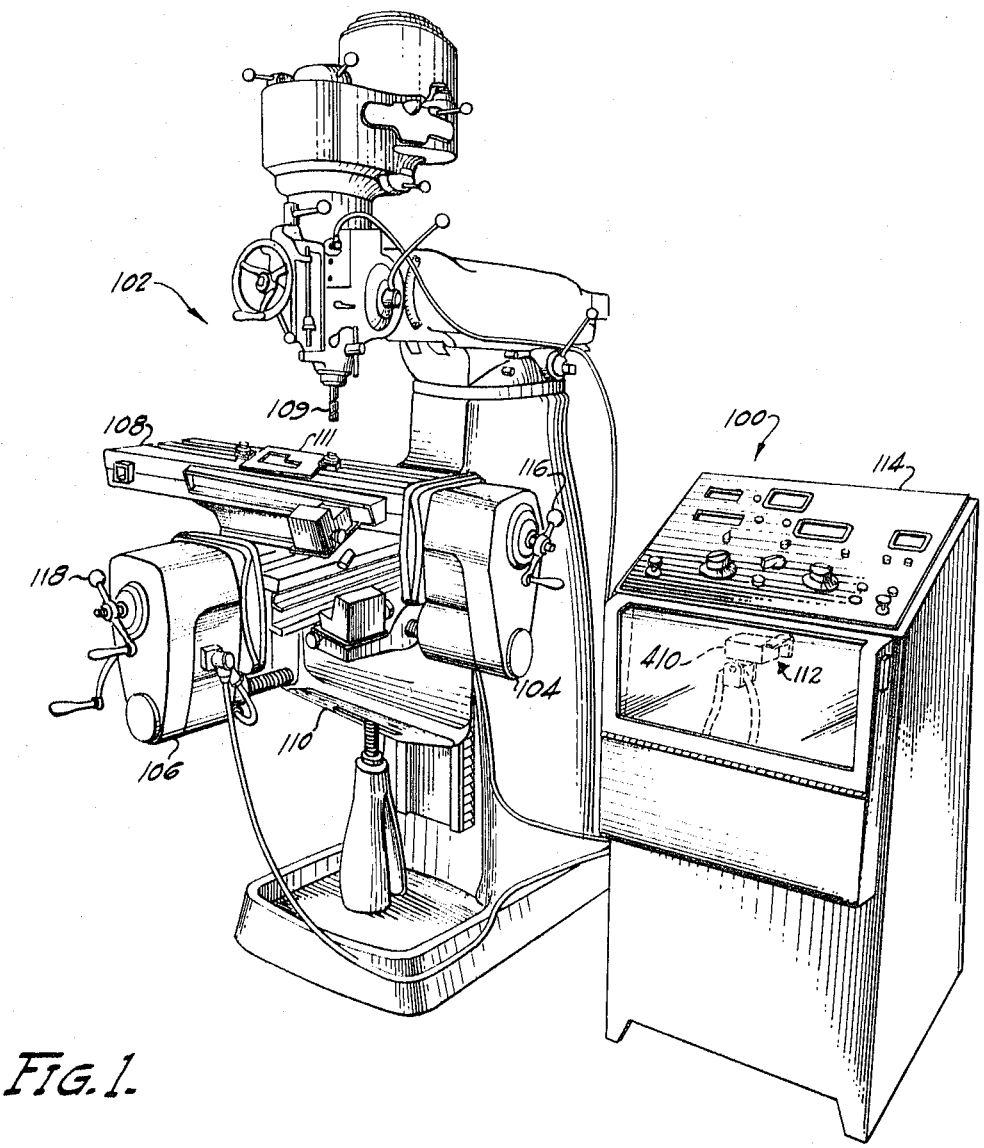
FIG. 1 is a perspective view of a milling machine in conjunction with a tape control console in which the control system of this invention is employed.

In order to maintain some order in the use of reference numerals throughout this description, the hundredths digit of the reference number will designate the figure number in which the component first appears. For example, the tape reader will have the reference number 112 because it is first described with respect to FIG. 1, and it will retain that number in all other figures in which it might appear.

GENERAL DESCRIPTION—FIGS. 1 AND 2

The control system shown and described in this specification is a two-axis numerical positioning and straight cut control for a standard type milling machine which has been built and operated by the applicants. As shown in FIG. 1 the control system, housed primarily in the control console 100, guides the operation of the milling machine 102 by controlling the operation of feed motors 104 and 106 which drive the carriages 108 and 110 in the respective X and Y coordinate directions. As the carriages move in these respective directions the work tool 109 may be caused to provide a cut in the workpiece 111.

The control console 100 includes the programmed material input in the form of a punched tape reader 112 along with a control panel 114 which includes all of the necessary operating dial switches and indicators required to operate the machine tool as will be hereinafter described.

The system herein described is essentially a numerical positioning and straight cut control which means that the machine can accurately make surface cuts along directions parallel with the X or Y coordinates but not at any angles to these directions. The positioning function of the control system refers to the control by which the machine tool is directed to a particular position at which point a function such as drilling a hole may be performed. During the positioning of the operation relative movement may be provided essentially along a 45° direction by the simultaneous operation of the two feed motors 104 and 106, but this angular drive is not normally used for surface cuts during straight cut control because of inherent inaccuracies.

Figure 2:
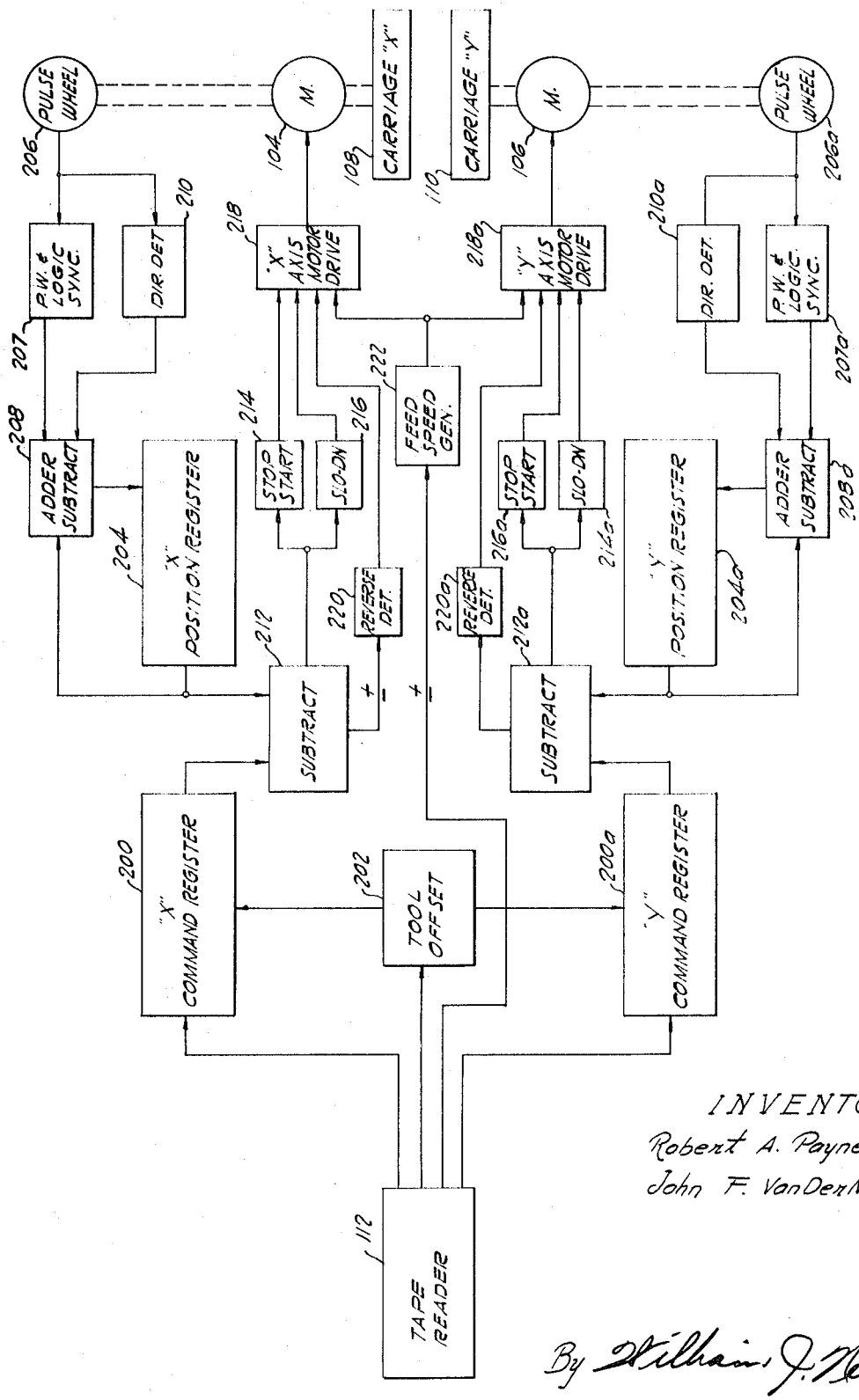
FIG. 2 is a simplified block diagram of the tape control system indicating the essential functions performed thereby.

As previously mentioned the machine control herein described has a perforated tape input. The punched tape conforms to EIA Standard RS–244 in its use of character codes and complies essentially with the universal word address variable block format EIA Standard RS–273. The system provides absolute plus and minus X and Y dimension programming in all four quadrants with respect to a zero reference. The zero reference is fully floating or adjustable over the entire range of each axis to provide maximum flexibility in the shape and size workpiece which may be fabriacted. Essentially the machine control is two separate digital servo-feedback systems, one for each of the X and Y coordinate directions fed by a single perforated tape input reader 112 as seen in the general diagram of FIG. 2. Since the X coordinate and Y coordinate systems are essentially separate except for the data inputs, the description hereinafter will refer primarily to the X coordinate system without notations to the Y system except where necessary. The data from the tape reader 112 is read into the respective Coordinate Command Register 200, 200a and combined with the tool offset data from the Tool Offset Control 202.

The actual position of the work tool support or carriages 108, 110 meanwhile is registered in the appropriate Position Register 204 through the action of a data element such as Pulse Wheel 206 driven by the feed motors 104. The Pulse Wheel 206 causes a pulse signal to be produced for each incremental distance through which the carriage 108 moves. The pulses are synchronized with the system by the Pulse Wheel and Logic Sync Circuit 207 and are added to or subtracted from the data in the Position Register 204 by circuit 208 in accordance with the direction of movement detected by the Direction Detector 210. That is, if the detector 210 detects that the pulse wheel is moving in a clockwise direction, the adder-subtractor circuit 208 will be caused to subtract the pulse wheel pulses from the contents of the Position Counter 204, and likewise add the pulses if the detector 210 indicates a counterclockwise pulse wheel direction in a manner as will be more fully described. The circuit 210 also synchronizes the pulse wheel pulses with the system logic in a manner to be hereinafter described.

The data contained in the Command Register 200 is compared with the data in the Position Register 204 by means of Subtractor Circuit 212. The difference output from the Subtractor 212 is transmitted through the Stop-Start Detector 214 and Slow-down Detector 216 to the Motor Drive Amplifier 218 which provides a driving voltage output to the motor 104.

The Slow-down Detector 216 causes a reduction in the drive voltage to the motor 104 when the carriage approaches its desired position as indicated by a predetermined minimum output from the Subtractor 212. Likewise, the Start-Stop Detector 214 stops the movement of the carriage when the output of the Subtractor 212 reaches zero indicating the carriage has reached the desired position. The Reverse Detector 220 controls the direction of movement of the carriage responsive to the sign of the difference detected by the Subtractor 212.

The perforated tape input also contains information regarding the desired speed of the drive motors 104, 106 which, of course, determines the feed rate of the work tool 109 with respect to the workpiece 111. A Feed Speed Generator Circuit 222 functions in response to the taped information to cause the Motor Drive Amplifier 218 to provide an output voltage to the motor 104 in accordance with the taped information.

PROGRAM—FIGS. 3 AND 3A

Figures 3, 3A:
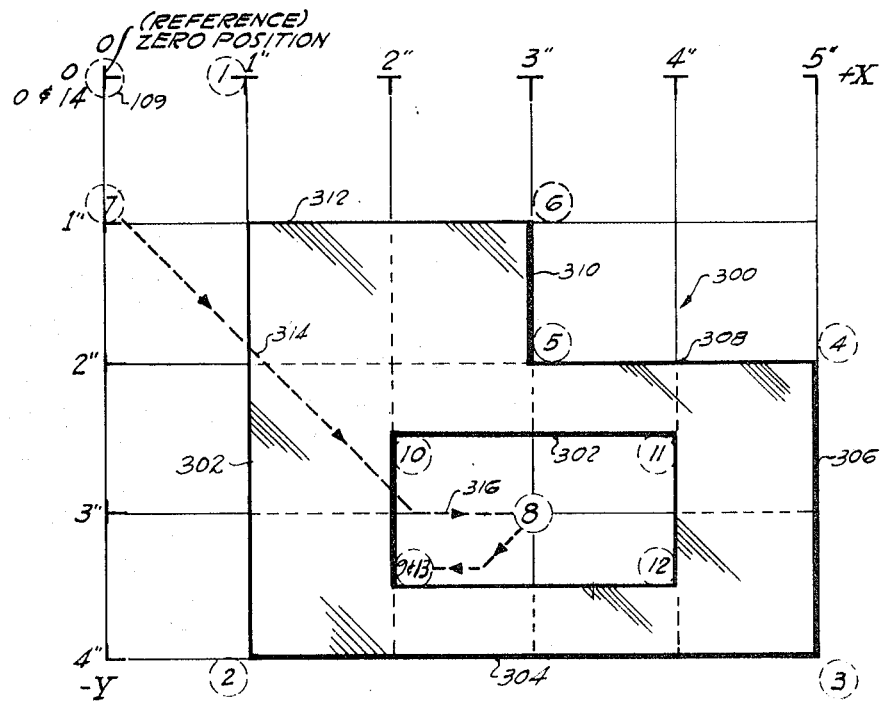
FIG. 3 is a plan view of a workpiece of a type which may be fabricated requiring tool offset compensation in accordance with this invention.
FIG. 3A is a process program chart used in the preparation of a tape for fabricating the workpiece of FIG. 3.
Figure 5:
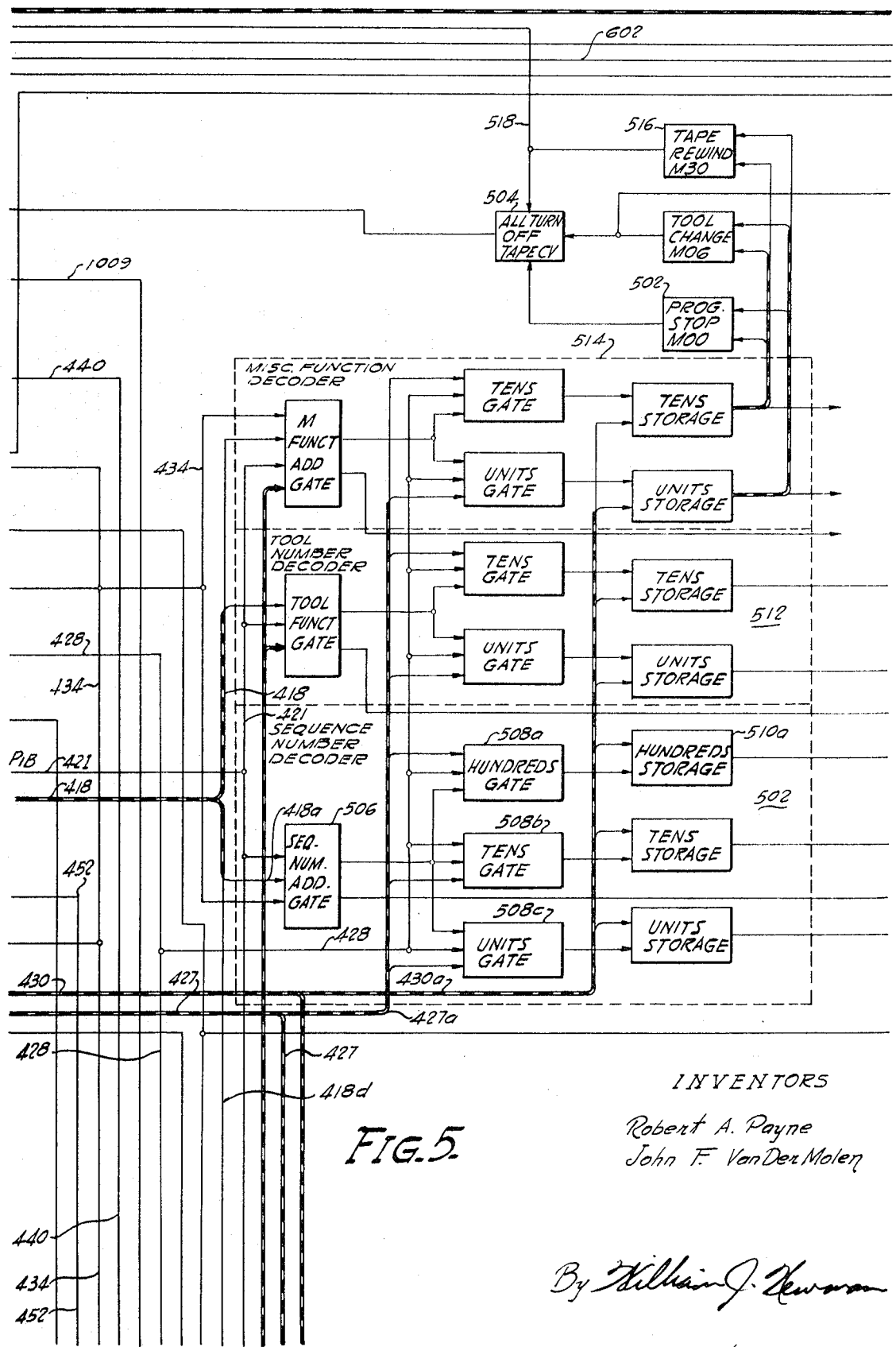

FIG. 3 shows a typical workpiece 300 which may be programmed for fabrication by the apparatus herein described. The part 300 includes a number of straight line exterior cuts as represented by the exterior outline of the part as well as a number of interior straight line cuts as represented by the interior surfaces formed by the rectangular aperture therein. This type of workpiece exemplifies the attributes of this invention because of the attention which must be paid to the size of the work tool being used.

The principle of operation may be understood by observing that the cutter is best controlled in terms of its centerline axis of rotation because it represents a fixed point on the tool with respect to the machine structure. The tool axis or center line must therefore stop short or overshoot the straight line cut final position for each step in order to provide the proper "offset" to machine a straight cut. In the preparation of the program for the control system a convenient reference "zero" position is selected, such as shown in FIG. 3, and the absolute positions of the corners of the workpiece from the zero position are entered into the tape program. The amount of cutter offset required is not entered onto the tape but is entered into the control system by means of digit dials or thumb wheels 2000 (FIG. 20) on the control panel 2002 at the console 100. The dimension entered on the digit dials 2000 is the cutter radius in 1,000ths of an inch. The only information that is punched into the tape regarding tool offset is the direction of that offset with respect to the reference zero position.

FIG. 3A shows the instruction sheet for preparing the tape to program the part shown in FIG. 3. The tape program begins first with an EOR (End of Record) character and then an EOB (End of Block) character. The EOR character provides a stop indicator when the tape is being automatically rewound after completing a program. When the EOR is detected during rewind the tape is switched to forward direction through the tape reader and advances until the EOB is detected at which point it stops, ready for the next part to be fabricated.

The first step designated N001 calls for moving the work tool to position 1 to ready it for making the first cut along the lefthand surface 302 of the workpiece. The surface 302 is located 1 inch the positive X direction from the zero reference position so that the cutter must move a distance equal to 1 inch, minus the radius of the cutter 109. The direction of cutter offset is indicated on the programmed instruction and the tape by the symbol G and either the number 43 or 44, G43 indicating plus cutter offset and G44 indicating minus cutter offset. Thus, step N001 calls for the cutter 109 to be moved from the reference zero position to a position 1 inch to the right of the reference zero position minus the cutter offset. The Y coordinate for this position is of course zero. The cutting edge of the tool therefore lies on the X=1 inch coordinate and is ready to cut the lefthand surface 302 of the workpiece. The symbol F19 in the program for the first step designates the desired feed speed of the carriage with respect to the work tool, as will be disclosed hereinafter. The EOB symbolizes the end of the block of information for the step and is a command to the machine to begin operation after the data for that step or block has been fed into the data circuit.

The second block of information—step N002—calls for the cutter to move from the number 1 position to the number 2 position in FIG. 3, thus cutting the left edge 302 of the workpiece. The lower lefthand corner of the workpiece lies at the coordinates X=+ 1 inch and Y=−4 inches so that the step 2 block calls for a Y position of −04000. The G44 symbol designates the tool offset and again calls for the offset in the negative direction so as to be added to the −0.0004 inch part dimension which will place the work tool in position to cut the bottom edge 304 of the workpiece after the second step has been completed. Step 3 calls for the cutter to move to position 3 of FIG. 3. At the end of this step the cutter must be properly aligned so that it may form the righthand surface 306 of the workpiece. The program, therefore, calls for movement in the X direction to +5 inches plus the tool offset as represented by the G function 43.

The program is automatically followed through steps 4, 5, 6 and 7, cutting the respective surfaces 306, 308, 310 and 312. Step 7 calls for movement of the cutter from position 6 to position 7 in the X direction to X=0 inches, Y=−1. Step 7 indicates the completion of the cuts for the external surfaces and it is desired to stop the cutter movement at position 7 so that it may be raised and moved to position 8 to begin the operations for cutting the rectangular aperture 302. As indicated the zeros need not be read into the tape and the information will be properly read in as long as the address character X is read in. Also there is no need to provide for cutter offset on this step because the next program step does not call for a cut on the workpiece.

Step N007 in the program of FIG. 3A includes the symbol M00 which calls for the machine to stop after it has reached the position designated in that block of information to enable the operator to lift the cutter. The slash character in the block of information tells the machine to disregard the next information which tells the operator to lift the cutter. The reason for the slash character is to prevent the machine from reading the information but permitting a tape operated typewriter to print out the information if it is desired to reproduce the program.

After the cutter is stopped at position 7, and the operator has lifted the cutter, the tape cycle start-stop button 2004 (FIG. 20) is pushed to continue the sequence. Step N008 calls for movement of the cutter to the coordinate position X= 3 inches, Y= −3 inches with no specification for tool offset because the tool is merely being positioned during this step. The program is again stopped at the end of this step so that the operator may plunge the cutter as the initial step in cutting the aperture 302. It will be noted in this step that both an X and a Y direction movement are programmed. Since the X and Y drive systems operate as separate servo systems, work tool will start out in an essentially negative 45° path as indicated by dotted line 314 until the Y coordinate position is reached. It will then continue along the X coordinate to the position 8 as indicated by the dotted line 316.

Step 9 calls for movement of the cutter to the position indicated 9 & 13 in FIG. 3. Again movement in both the X and Y directions is programmed in this step and the positive cutter offset direction is indicated by the symbol G43 which is applicable to both directions. Steps 10, 11, 12 and 13 move the cutter in the proper directions to complete the rectangular aperture 302 ending again at the position marked 9 & 13 where the program is again stopped so that the operator may lift the cutter. When he punches the stop-start button 2004, again, the cutter is returned to the reference zero position in accordance with program step N014 which completes the cycle. The symbol M30 at the end of the program calls for the tape to be rewound to ready it for the next workpiece.

It will be noted in the program of FIG. 3A that steps N001, N008 and N014 call for a feed speed designated F19 whereas all of the other steps call for a feed speed designated as F09. The F19 designation calls for a high speed movement of the cutter which is permitted because the work tool is not performing a cutting operation during these steps. The F09 designation calls for a slower feed speed during the cutting steps which speed is commensurate with the material being worked on and the type of surface desired.

The preceding discussion of the program for a simple workpiece, calling for both straight line cutting and positioning of the work tool, indicates the flexibility of the apparatus permitted by the cutter offset provisions of this invention. The coordinate information called for in the program refers to the locations of the various points on the workpiece from the reference zero and contains only the direction of cutter offset required for proper positioning of the work tool to accurately cut the workpiece. Since the cutter offset dimension is controlled by the digit dials 2000 on the manual control board 2000 of the console 100, this program may be used regardless of the size cutter being used. Each time the cutter is sharpened, or each time a new cutter is used, the operator merely measures the diameter of the cutter and inserts the radius dimension into the machine by means of the digit dials. This cutter offset read-in system also permits the same cutter to be used for roughing cuts and finishing cuts without changing the tape. The rough cut is performed with a slightly smaller than actual tool offset dimension on the digit dials and the finishing cut is performed with the actual tool offset dimension.

TAPE CIRCUITS—FIGS. 4-12, 13, 14 AND 15

Figure 12:
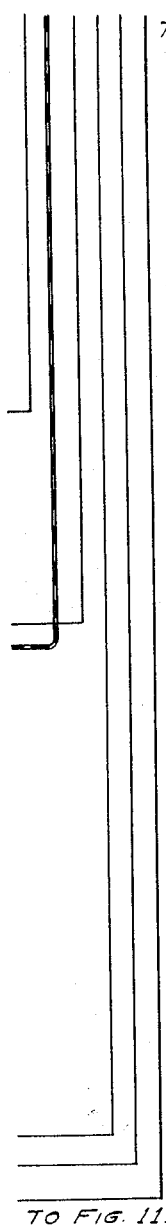
Figure 12A:
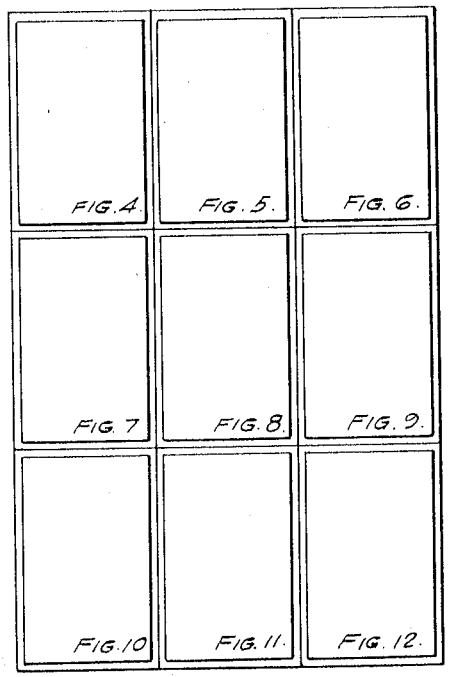
Figure 13:
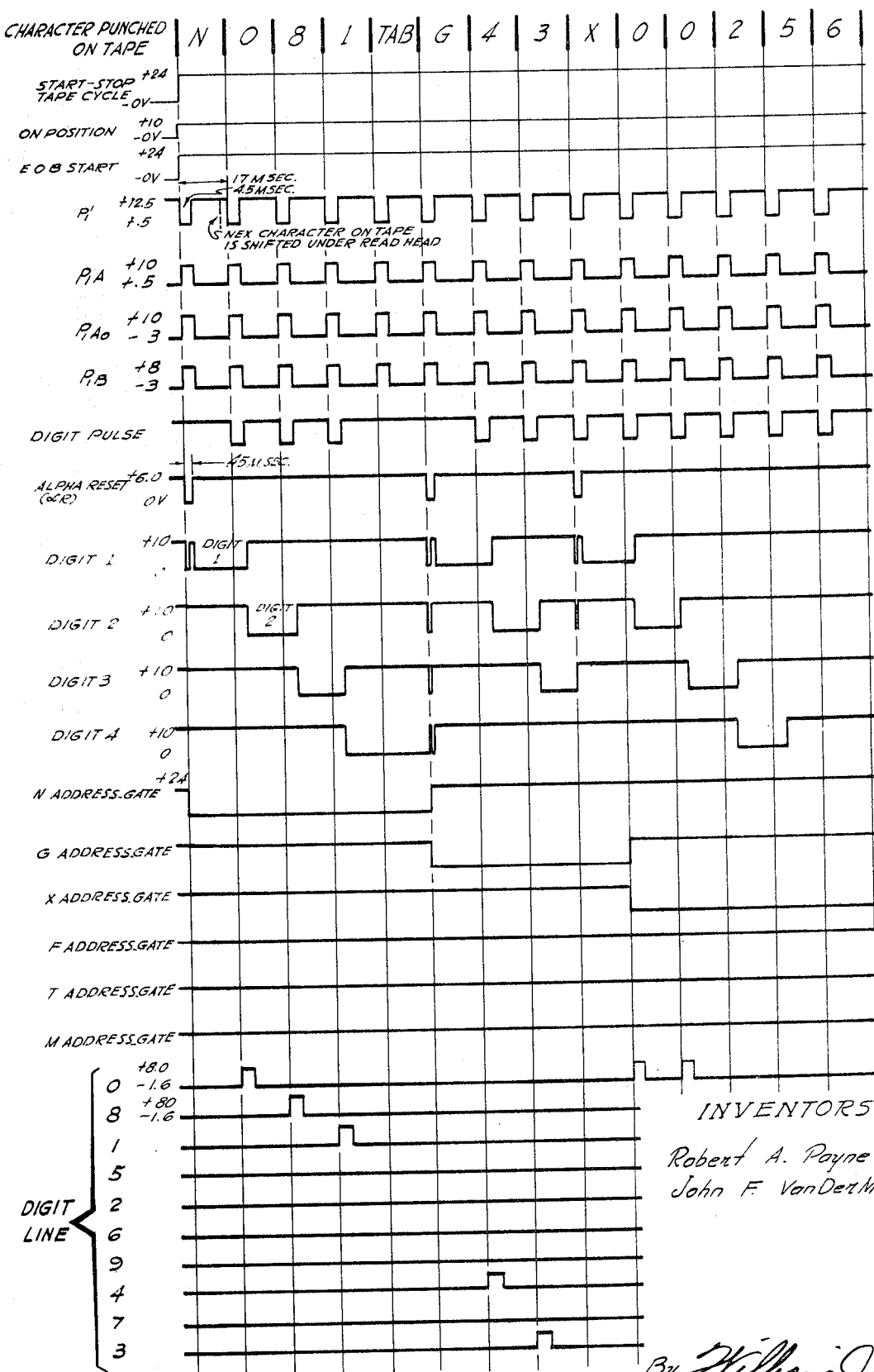
FIGS. 13 and 14 are diagrams of the timing signals of various elements for the tape reader circuits to be arranged in the manner shown in FIG. 15.
Figures 14, 15:
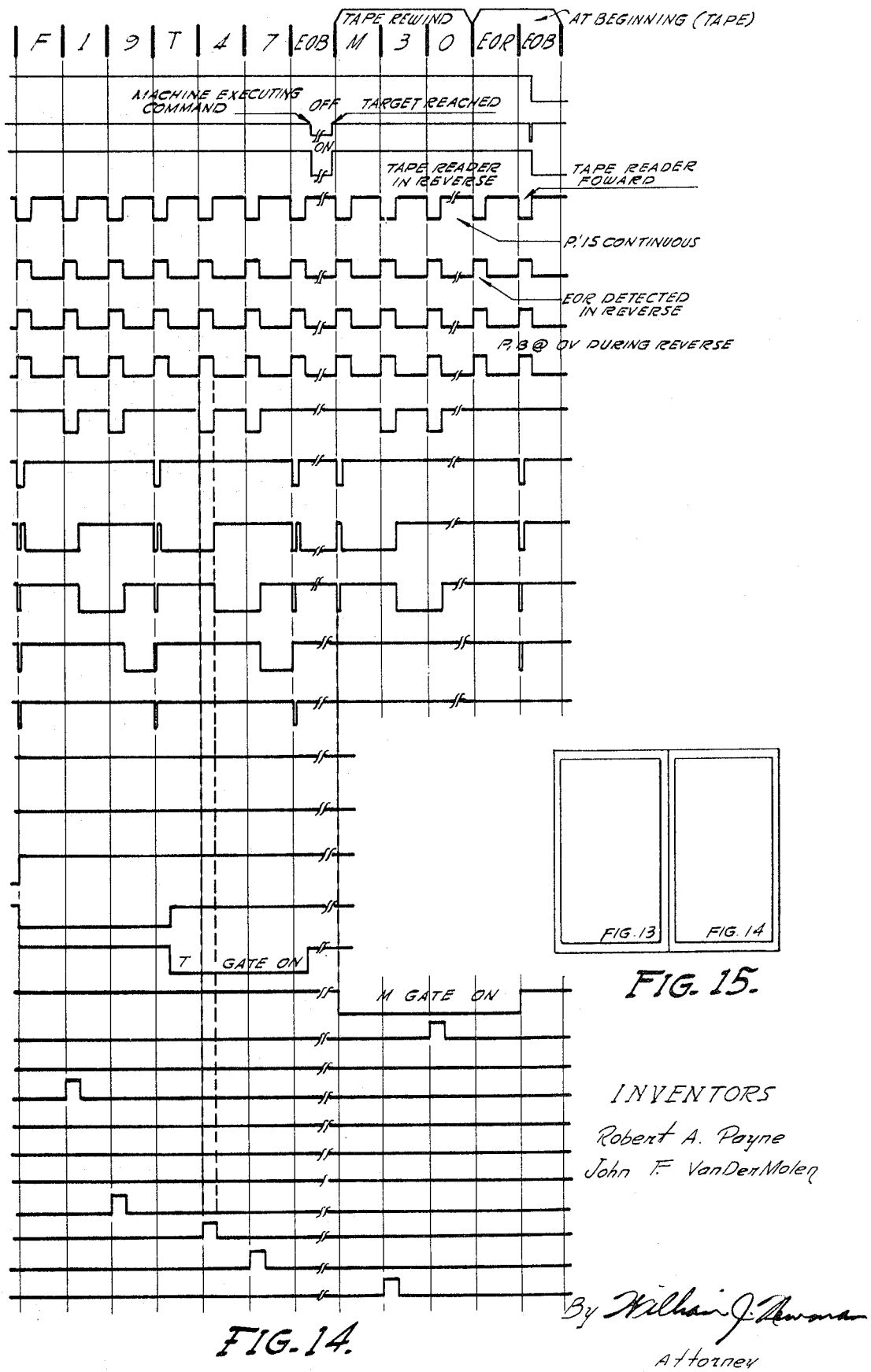

A general description of the complete control system utilizing the block diagrams of FIGS. 4–12 arranged in the manner shown in FIG. 12a will now be given. As a further aid the timing diagrams FIGS. 13 and 14, showing the output waveforms of the various circuits, will be used. FIGS. 13 and 14 are to be joined as shown in FIG. 15.

The operation of one sequence step or block of information will be described and the program information for that step appears at the top of the combined FIGS. 13 and 14. The sequence step shown happens to be the last sequence operation in the program so that it includes the tape rewind signals at the end of the step. As may be seen this is the 81st step and calls for a movement in the X direction to a position +0.256 inch from the zero X reference plus the tool offset dimension as indicated by the function G43. The feed rate is indicated by the designation F19,and T47 indicates the tool number to be used. The tab character appearing after the sequence number N081 and before the tool offset function is merely a spacing indicator which is desirable for the operation of a tape controlled typewriter for reproduction of the tape program, and permits each of the functions to be typed in a column. Tabs may be used between each of the other functions, but are not shown herein because of space requirements.

Figure 6:
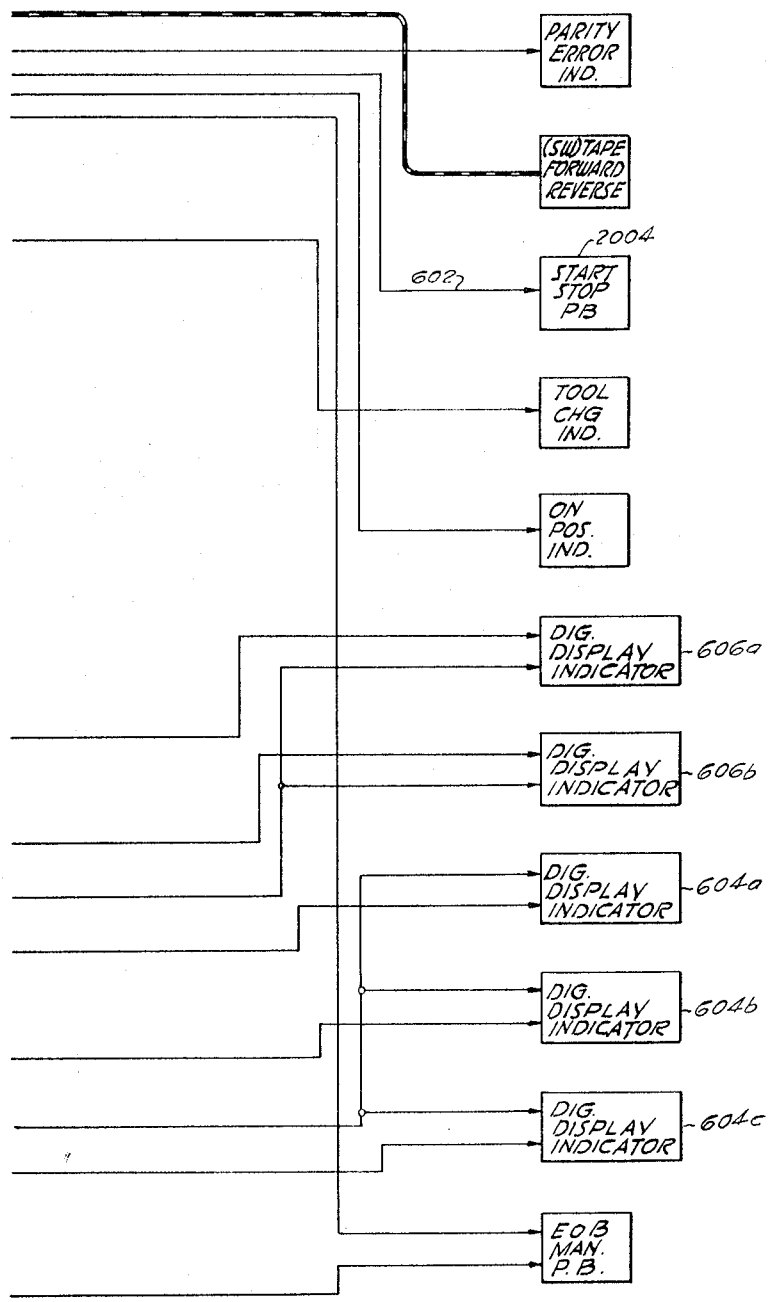
Figure 20:
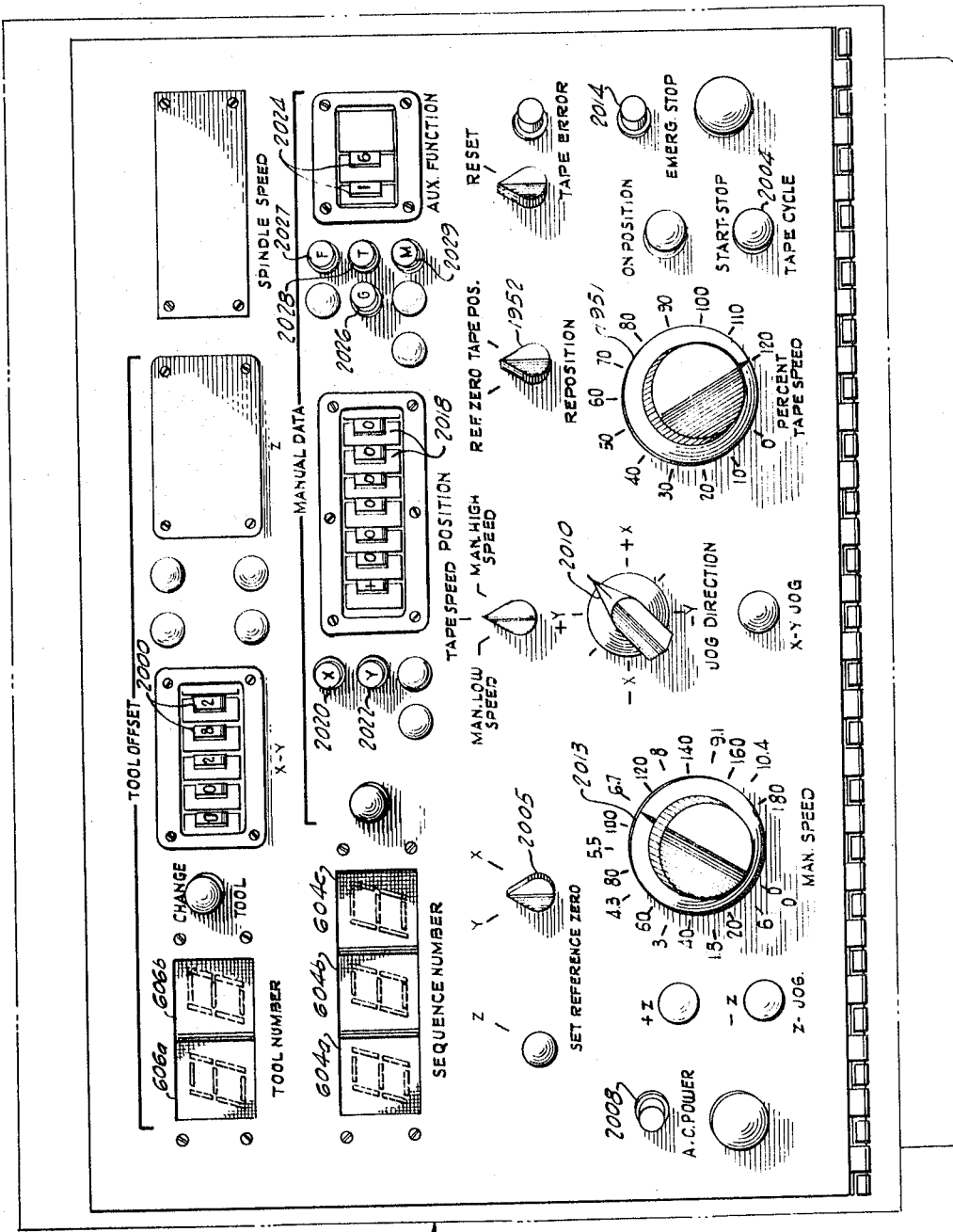
FIG. 20 is a plan view of the control panel for the tape control system.

Assuming that the previous step N080 called for a tool lift or other such operator controlled function, the program has stopped and must be initiated by the operator by pushing the Tape Cycle Start-Stop Button 2004 (FIGS. 6 and 20). This sends a signal over line 602 to the Start Control 402 (FIG. 4) in the Character Decoder and Timing Control Circuit 400. It will be recalled that the previous sequence had called for a program stop so that the program stop detector 502 had caused the Turn-off Tape Cycle device 504 to signal the Start Control 402 to an off condition. The start signal from line 602 causes the Start Control 402 to actuate the Tape Read Pulse Generator 404. The Pulse Generator 404 generates the P1' pulses shown in the timing diagrams which are delivered through the Forward Tape Control 406 to the Tape Reader Drive Circuit 408. The Tape Reader Drive Circuit moves the tape to bring the alpha character N under the Tape Reading Head 410. The perforations in the tape indicating the letter N are strobed and the resultant signals fed to the Alpha and Numeric Character Decoder 412 both directly through conductors 414 and through the Data Inverter 416. The N signal from the Alpha and Numeric Character Decoder is transmitted to a Sequence Number Address Gate 506 in the Sequence Number Decoder 502 (FIG. 5) via the multi-line conductors 418, 418a. The Address Gate 506 prepares the circuits for actuating the Sequence Number Digit Display Indicators 604a, 604b and 604c on the control panel to indicate the sequence numbers. It is to be noted that the Alpha and Numeric Character Decoder 412 is a conventional diode "AND" type decoder which has a number of output conductors with signals appearing on selected ones in accordance with the character decoded. For convenience in tracing these lines, the group of conductors is indicated as 418 and the lines going to the individual address gates are given the number 418 with a small letter designation thereafter.

The N address signal is gated with a P1b pulse from a Character Read Pulser Circuit 420 and conductor 421 in the Sequence Number Address Gate 506 which prepares Digit Gates 508a, 508b and 508c for the receipt of the next following digit pulses by placing a low at one of the inputs of each gate. The P1b pulses generated by the Character Read Pulser 420 are just opposite in phase to the P1' pulses as shown in the timing diagrams.

It may be seen that the P1' pulse and P1b pulse which synchronize the reading of the alpha character N also energize the Tape Drive Circuit 408 to move the tape to the next character. However, the pulses are only about 4.5 milliseconds in length while it takes approximately 14 milliseconds for the tape to advance to the next character so that the alpha character N is read in plenty of time. The detection of the alpha character N also causes the generation of an alpha reset pulse on line 434 by Alpha Reset Generator 432. This signal prepares Digit Shift Register 426 which has five outputs. For the sequence number operation, however, only the first three outputs are used, namely, digit 1—digit 2—and digit 3— which are represented by the multi-line conductor 427, 427a. As shown in the timing diagrams, FIGS. 13 and 14, the alpha reset pulse causes the originally high output of the digit 1 output of digit shift register 426 to go low in preparation for the reading of the first numeric character of the sequence number. Thus, the digit 1 pulse is gated in the 100s Gate 508a with the signal from the Sequence Number Address Gate 506 and a P1' pulse over conductor 428 from the Tape Reader Drive Circuit 408 to provide an enabling signal to the 100s Storage Circuit 510.

The Numeric Character Decoder 422 detects the numeric character zero and provides the proper signals on the "zero line" of the 10-line conductor 430, 430a leading therefrom to 100s Storage Circuit 510a. The 100s Storage Circuit 510 actuates the 100s Digit Display Indicator 604 (FIGS. 6 and 20) to display the digit zero.

As previously indicated the P1' pulse which caused the reading of the 100s digit zero into the 100s storage circuit 510, and hence the display on the 100s Digit Display Indicator 604, also operates to shift the next character on the tape under the reading head in the Tape Reader 410. The trailing edge of that same P1' pulse which is inverted by the P1b pulser 420 causes the Digit Pulse Generator 424 to generate a digit pulse which in turn causes the Digit Shift Register 426 to shift and cause a low going pulse on its digit 2 output, provided, of course, that the next character is a numeric character as indicated by Numeric Detector 422. The digit 2 output of shift register 426 is connected directly to the tens gate 508b by conductor 427a and thus causes it to open on the receipt of the third P1' pulse. The Tens Storage Circuit 510b is thereby enabled to receive a pulse on the 8 line of 10 line conductor 430a which is the second most significant digit of the sequence number N081. The number 8 is then indicated on the Sequence Number Digit Display Indicator 604b. The Units Gate 508c and the Units Storage Circuit 510c are enabled for reading the units digit 1 in the same manner as described for the 100s and 10s digits.

The program step number N081 has now been read into the Sequence Number Decoder 502 and displayed on the respective Digit Indicators 604a, 604b and 604c. As indicated in FIG. 13 the next character on the tape is a tab symbol which is ignored by the system and is provided only for a tape operated typewriter as previously indicated.

Figure 7:
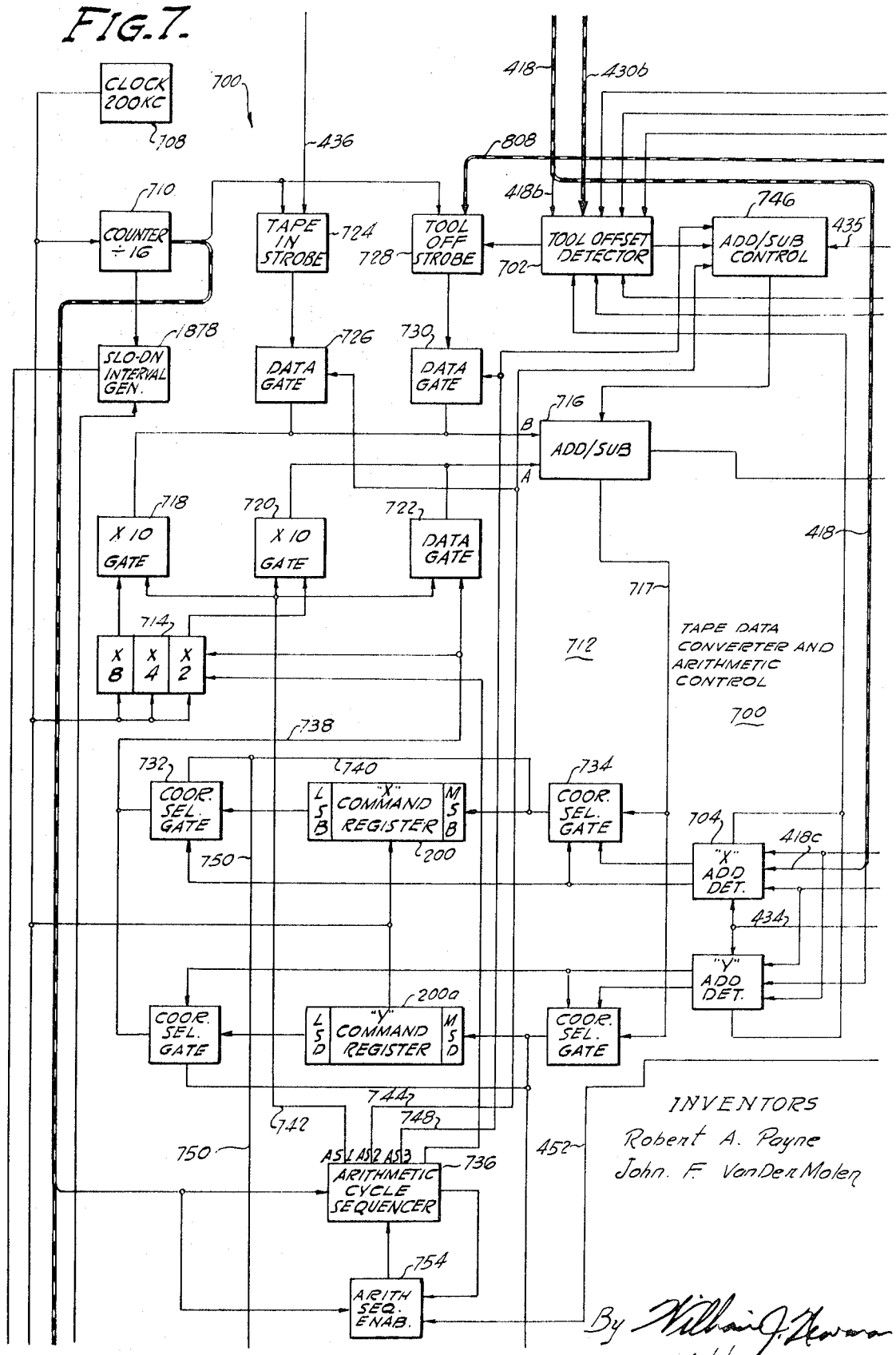

The next symbol is the alpha character G which indicates that the following numeric information refers to the direction of cutter offset for that program step. The Alpha and Numeric Character Decoder 412 produces the appropriate signals on its output conductors 418 and 418b to the Tool Offset Detector 702 in the Tape Data Converter and Arithmetic Control Circuit 700 (FIG. 7). The specific numeric characters 43 which indicate a positive tool offset compensation are detected by the Numeric Character Decoder 422 and provide the appropriate signals over conductors 430 and 430b to the Tool Offset Detector 702. These signals prepare the Tape Data Converter and Arithmetic Control Circuit in a manner to be hereinafter described for positive tool offset. Detection of the G character also causes the generation of an alpha reset pulse by the Alpha Character Reset Generator 432 on its output conductor 434 to turn off the Sequence Number Address Gate 506 as well as all other alpha character detectors not being addressed at the time. The Sequence Digit Display Indicators remain lit however until the next sequence step.

Data relating to the amount of tool offset is received from the Tool Offset Thumb Wheel Switches 2000 (FIG. 9) in the Control Panel 2002 via conductor 904, a Binary to BCD (binary coded decimal) Converter 806, and a four line conductor 808 to the Tape Data Converter and Arithmetic Control Circuit 700. The tool offset information is thus presented to the arithmetic circuits in binary coded decimal form, one digit at a time.

The next character, according to FIG. 13, is the alpha character X which indicates that the following numeric information pertains to the position from the reference zero the machine carriage is to move in the X coordinate direction. The alpha character X being detected by the Alpha and Numeric Character Decoder 412 causes it to send a signal over its output conductors 418, 418c to the X Address Detector 704 to prepare the X arithmetic circuits. The sign of the data is detected by Minus Sign Detector 433 which transmits an appropriate signal via conductor 435 to the Arithmetic Circuit 700. The numeric characters relating to the desired position of the carriage do not go through the character decoders 412 and 422 in this case, but rather are transmitted directly to the Tape Data Converter and Arithmetic Control Circuit 700 from the data inverters 416 over a four line conductor 436. The position information is thus supplied to the arithmetic circuit 700 in binary coded decimal form, one digit at a time in the same manner as the tool offset data.

The manner in which the desired position tape input is combined with the tool offset information will be described in detail hereinafter but briefly it is combined one digit at a time, most significant digit first, and least significant digit last. Each BCD digit from the tape is converted to straight binary code and is added to the same significant BCD digit of the tool offset after it has been converted to straight binary. After all digits have been read in, the combined data appears in the X Command Register 200 in the Arithmetic Control Circuit 700.

Figure 8:
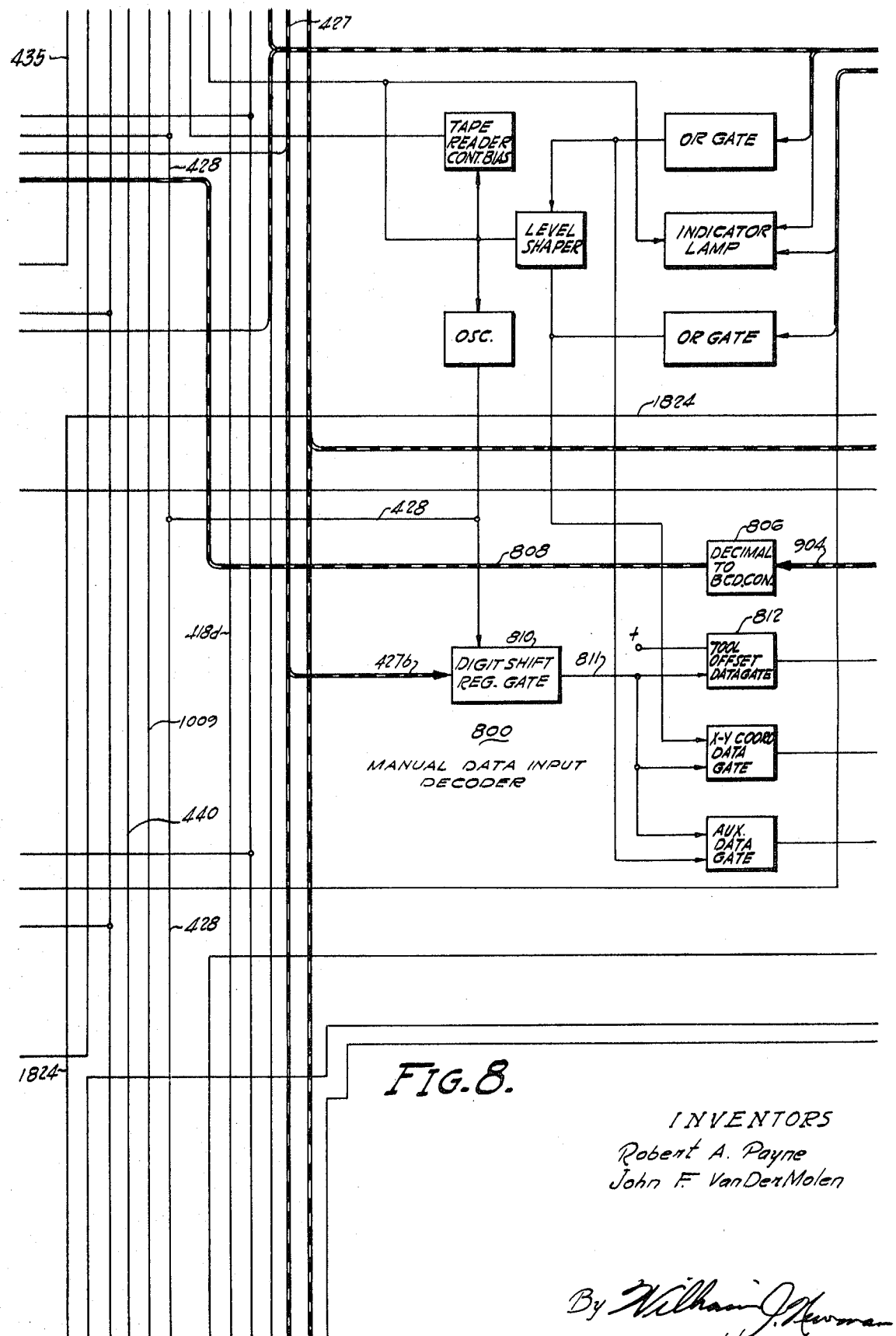
Figure 9:
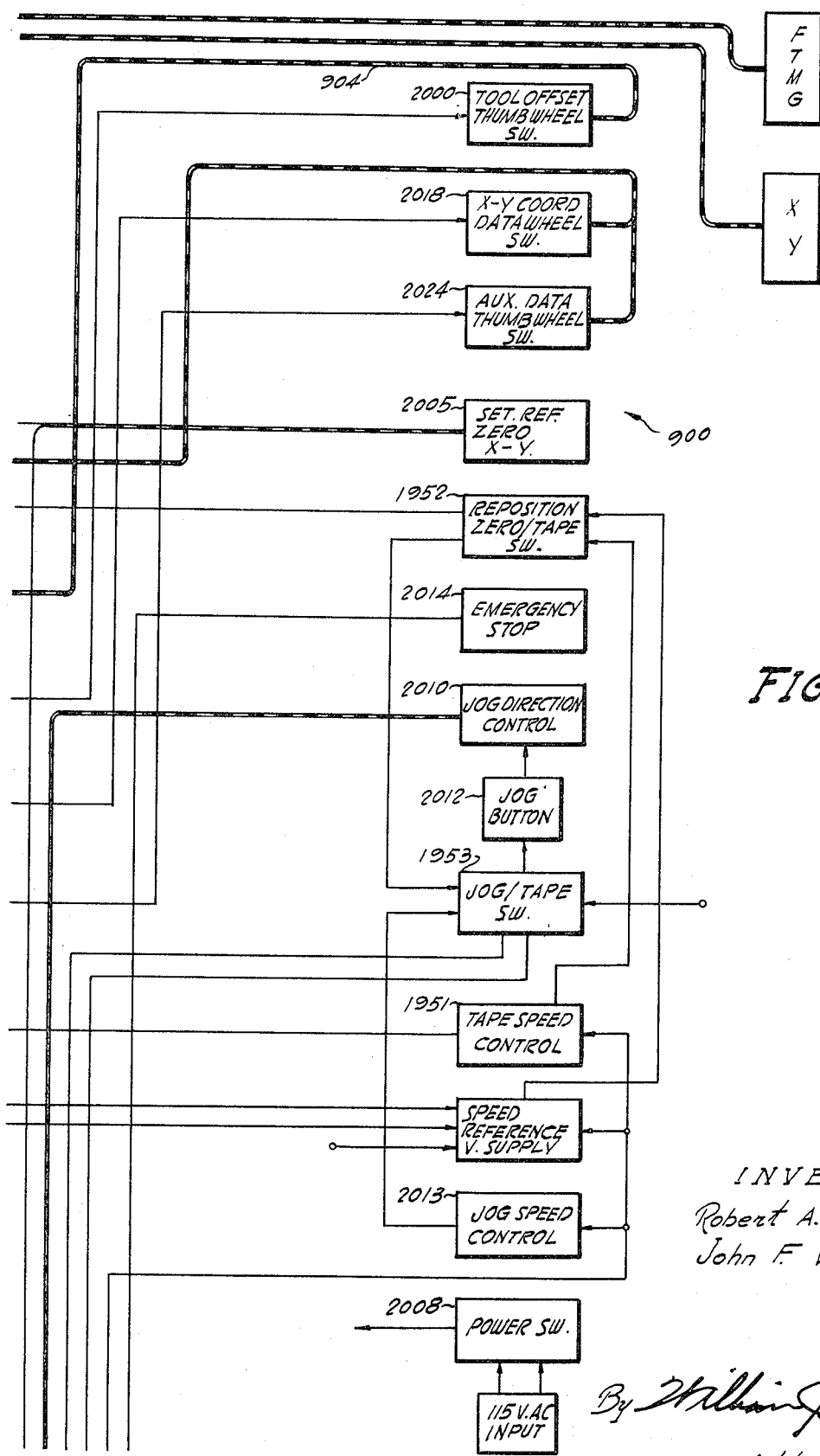

The tool offset data from Thumb Wheel Switches 2000 is coordinated with the position data from the tape by means of the Digit Shift Register 426 which transmits digit 1 through digit 5 pulses on its five wire output 427 and 427b to the Digit Shift Register Gate 810 in the Manual Data Input Decoder 800 (FIG. 8). The digit 1 through digit 5 pulses are gated with P1' pulses on conductor 428 from the Tape reader Drive Circuit in the Digit Shift Register Gate 810 and thus five staggered sequence pulses appear on the five line output 811 therefrom, each line carrying one pulse. The five line output is connected through the Tool Offset Data Gate 812 to the Tool Offset Thumb-wheel Switches 2000. There are five Thumbwheel Switches 2000 and the staggered pulses on the five-wire input thereto each strobe one of the switches in proper sequence from the most significant digit switch to the least significant digit switch with the 10 line output conductor 904 carrying the appropriate output pulse on the appropriate zero through 9 conductor. The Binary to BCD Converter 806 provides the numeric information over the four line digit conductor 808 to the Tape Data Converter and Arithmetic Control in binary coded decimal form so that it may be properly combined with the tape information. The tool offset information is conbined with the desired position information from the tape in the circuit 700, the combined information thus appearing in the Command Register 200 in straight binary notation. If Y coordinate information is required it would be entered in the same manner as the X information with the tool offset information coordinated also in the same manner.

After the position data X 00256 and the tool offset data have been read into the Tape Data Converter and Arithmetic Circuit 700, the feed drive speed information is next inserted into the control system. The alpha character F is decoded by the Alpha and Numeric Character Decoder 412 and transmitted through the output conductor 418, 418d to the Feed Rate Address Gate 1004 in the X and Y Feed Speed Generator Circuit 222. The alpha character reset pulse generated by the circuit 432, responsive to the detection of feed rate address character F, turns off the X Address Detector to prevent the subsequent numerical information from being inserted into the Tape Data Converter and Arithmetic Control 700. With the F Address Gate prepared, the following numeric characters 1 and 9 enable the X and Y Feed Speed Generator 222 for causing the X Axis Motor Drive 218 (FIGS. 2 & 10) to drive the X Axis Motor 104 at the desired speed.

The tool number information T47 is read into the Tool Number Decoder 512 (FIG. 5) in the same manner that the sequence number N081 was read into the Sequence Number Decoder 502. The tool function information is displayed on the Tool Function Display Indicators 606a and 606b to show the operator the proper tool to be used.

All of the information from the tape and from the tool offset switches for controlling the process step has now been entered into the system. The detection of the EOB (end of block character) by the EOB Detector 438, which receives its input from the Data Inverters 416 and triggered by the P1' pulse from line 428, begins the machine operation. The EOB Detector 438 disables the Tape Reader Pulse Generator 404 to stop the tape reader mechanism from further advancing the tape and sends a signal over line 440 to the Stop-Start Detector 214 (FIGS. 2 and 10) of the X Axis Logic Control Circuit 1006. The EOB signal also triggers the Clutch Control 1008 in the X Axis Motor Drive 218 for proper drive of the carriage.

The combined desired tool position and tool offset information in the X Command Register 200 (FIG. 7), which appears on conductor 750, is compared with the carriage actual position information in the X Axis Position Register 204 (FIG. 10), by Subtractor 212 and as long as a difference exists therebetween, the motor 104 is kept operating to drive the X carriage in a manner to be described in fuller detail later. The operation of the Slow-down Detector 216 and Stop Detector 214 as the carriage approaches the desired position will also be described in more complete detail later.

When the target position is reached the Axis-On-Position Detector 442 (FIG. 4) is notified from the Stop-Start Detector 214 via line 1009. The Axis-On-Position Detector 442 triggers the Start Control 402, causing the Tape Read Pulse Generator 404 to reactuate the Tape Reader Drive 408 and bring the next character M under the Tape Reader 410.

The M character is detected by the Miscellaneous Function Decoder 514, and the following numeric characters are registered therein in much the same manner as provided by the Sequence Number Decoder 502. The specific code M30 indicates the end of the process and thus causes the Tape Rewind Decoder 516 to signal for reverse operation of the Tape Drive Circuit through line 518 to the Tape Rewind Circuit 444. The Tape Rewind Circuit 444 pulls in the Tape Reverse Control 446 which remains in control until an EOR character at the beginning of the tape is detected by the EOR Detector 446. The EOR Detector 448 cuts off the Tape Rewind 444 as well as Reverse Control 448, and reactuates the Forward Control 406 to start the tape in the forward direction again. The tape advances until an EOB character is detected which stops the tape drive mechanism. The program cycle is thus completed and the operator removes the finished workpiece. If a new piece is to be fabricated a piece of unfinished stock is placed on the carriage and the start-stop pushbutton 2004 is pushed to start the complete program again.

TOOL OFFSET—GENERAL—FIG. 7

As previously noted, the position numeric information on the tape is in binary coded decimal notations. That is, each decimal weighted digit maintains its identity but its numeric value is coded in binary form. The tool offset information in the Thumb-wheel Switches 2000 is in decimal form but this is converted into binary coded decimal as previously noted. The tool offset data is combined with the desired position tape data, decimal digit by decimal digit, and the results are converted into straight binary notations. Thus, the Tape Data Converter and Arithmetic Control Circuit 700 of FIG. 7 receives the desired position tape information and the tool offset information in binary coded decimal notation, combines them and converts the results to straight binary notations so that the results are stored in the Command Register 200 in straight binary notation. The rest of the arithmetic computation, including the comparison between the contents of the Command Register 200 and the Position Register 204, is also done in straight binary notation.

The Command Register 200 (FIGS. 7 & 17) is a 16-bit shift register which, when the arithmetic cycle is completed, will contain the target position information in 16-bit straight binary code, with the least significant bit being connected to the output of the register and the most significant bit being connected to the input of the register. Thus, the last stage of the register from which the output is taken represents the $2^0$ digit whereas the input stage represents the $2^{15}$ digit. The information in the Command Register is circulated through an arithmetic loop 712 by a 16 count cycle provided by a Clock 708 and a Divide By Sixteen (16') Counter 710. The Clock 708 is a pulse generator and the 16 Counter provides the logic timing for the control by providing pulse cycles of 16 counts each in a well known manner as described more fully later. The 16 Counter 710 provides output pulses for the first, second, third, fourth and 16th counts of each 16 count cycle. The pulses will hereinafter be referred to as $Cl\,1$, $Cl\,2$, $Cl\,3$, $Cl\,4$ and $Cl\,16$ pulses. The arithmetic loop 712 comprises a Times Ten (×10) Multiplier 714 and a Full Adder-Subtractor 716. The arithmetic loop also includes Times Ten (×10) gates 718 and 720 for controlling the output of the ×10 Multiplier 714 to the respective B and A inputs to the Adder-Subtractor 716, and Data Gate 722 for permitting the Command Register information to be circulated directly from its output to the A input of Adder-Subtractor 716 without passing through the ×10 Multiplier.

The tape data relating to the desired position is received from the Character Decoder and Timing Control Circuits 400 over the four line conductor 436 which carries the binary code information for the particular decimal digit being read by the tape reader. The parallel information received on the four line conductor 436 is strobed in the Tape Input Strobe Gates 724 with the output therefrom being a signal comprised of serial pulses. They are fed through a Data Control Gate 726 to the B input of Adder-Subtractor 716 in synchronization with the serially received information from the Command Register 200 at input A so that they may be properly combined therein in accordance with the sign signal from the Minus Sign Detector 433.

The tool offset information is received on the four line conductor 808 by the Tool Offset Strobe Gate 728 which converts the parallel received offset information for the particular digit being read into a serial pulse output. The serial pulse output is fed through the Data Control Gate 730 to the B input of Adder-Subtractor 716 where it is properly combined with the contents of the Command Register 200 at the A input.

The Coordinate Selection Gates 732 and 734 in the arithmetic loop serve to select the proper Command Register 200, 200a dependent upon the tape designation calling for movement in the X or Y coordinates in a manner to be hereinafter described.

The operation of the ×10 Gates 718, 720 and Data Gates 722, 726, 730 is controlled by an Arithmetic Cycle Sequencer 736, which is triggered through Arithmetic Sequence Enabler 754 by each digit of the tape code via conductor 452 from the Digit Pulse Generator 424 (FIG. 4), to properly sequence the operation of the arithmetic loop 712. Thus, the arithmetic loop is triggered to cycle and combine the tape and tool offset for each digit of the binary coded decimal tape input.

The Tape Data Converter and Arithmetic Control Circuit 700 operates in the following manner to combine the desired position tape information and the tool offset information. Upon the detection of the alpha character X or Y (for this description we will continue to assume an X has been signified), the Alpha Character Decoder 412 will send over its output conductors 418 and 418c the proper signal to the X Address Detector 704. The Address Detector 704 causes the Coordinate Selector Gate 732 to open and complete the circuit from the output of the Command Register 200 to the conductor 738 of the arithmetic loop 712. The output of the Command Register is disconnected from the recirculate line 740. After the operation of gate 732 the Coordinate Selector Gate 734 is closed for a period of approximately 500 microseconds to prevent information from the Adder-Subtractor 716 to be fed over conductor 717 to the input of the X Command Register 200. During this 500 microseconds the Clock 708, which operates at approximately 200 kilocycles per second, pulses the Command Register 200, and, because the input thereto is closed by gate 734, the register is cleared to read all zeros.

About 17 milliseconds after the receipt of the alpha character X, the most significant digit of the numeric position information on the tape is ready to be read into the Tape Data Converter and Arithmetic Control Circuit 700 unless the data is preceded by a minus sign in which case the Adder-Subtractor is first conditioned for entering the negative data by means of the Minus Sign Detector 433 and the Add/Subtract Control 746. The entrance of the numeric data is triggered by the first digit pulse after the X character (see FIGS. 13 and 17A), transmitted on line 452 to the Arithmetic Cycle Sequencer 736. On the next Cl 16 pulse from the output of the 16 Counter 710, after the receipt of the digit pulse, the Arithmetic Cycle Sequencer develops an AS-1 signal on its output conductor 742 to open the ×10 Gates 718 and 720, and close the Data Gate 722. The contents of the Command Register 200 is thus fed through the Coordinate Selector Gate 732, conductor 738, ×10 Multiplier 714, ×10 Gates 718, 720, Adder-Subtractor 716, Coordinate Selector Gate 734 and returned to the input of the Command Register. The Data Gates 726 and 730 are both closed during the AS-1 period of the Arithmetical Cycle Sequencer so that no information from the tape or the tool offset is being entered. It will be recalled that immediately previous to this first sequence the Command Register was cleared to zero so that only zeros were being shifted by the clock pulses through the arithmetic loop 712 during the AS-1 period.

At the next Cl 16 pulse of the 16 Counter 710 the Arithmetic Cycle Sequencer produces an AS-2 signal on output conductor 744 which opens Data Gate 726 for the tape information and signals the Add-subtract Control 746 in a manner and for a purpose to be hereinafter described. During the AS-2 period, the AS-1 output returns to normal which closes the ×10 Gates 718, 720 and opens the Data Gate 722. Thus, the contents of the Command Register 200 will be fed directly to the Adder-Subtractor 716 through Coordinate Selection Gate 732, conductor 738 and Data Gate 722. The information from the tape relating to the most significant digit of the command position is fed to the Adder-Subtractor 716 and is synchronized with the information from the Command Register 200 because the Tape-In Strobe Gate 724 is strobed by the Cl 1 through Cl 4 pulses of the 16 Counter 710. Thus, the one bit from the first digit of the tape code is strobed and inserted into the Adder-Subtractor 716 in synchronism with the least significant bit of the Command Register 200, the two bit from the tape is synchronized with the second least significant digit of the Command Register, the four bit from the tape is synchronized with the third least significant digit of the Command Register and the eight bit from the tape is synchronized with the fourth least significant bit of the Command Register. The remainder of the 16 clock pulses forming the cycle return the information to the proper bit places in the Command Register, and, since the Command Register registered all zeros prior to the reading of the first digit tape, it now contains in straight binary code the most significant digit of the desired position dimension of the X coordinate appearing on the tape.

The corresponding most significant digit of the tool offset information is next combined with the most significant digit of the tape number entered into the Command Register 200. Thus, a subsequent Cl 16 pulse from the 16 Counter 710 triggers the Arithmetic Cycle Sequencer 736 to produce an AS-3 output on the conductor 748 which opens Tool Offset Data Gate 730 and triggers the Add/Subtract Control 746 to signal the Adder-Subtractor 716 to add or subtract in accordance with the G number previously read into the Tool Offset Detector from the tape. The loss of the AS-2 signal on line 744 closes the tape information Data Gate 726. The information on the four conductor line 808 from the tool offset circuits is strobed by the Cl 1 through Cl 4 pulses in the Tool Offset Strobe Gate 728 so that the information is entered into channel B of the Adder-Subtractor 716 in synchronism with the entrance of the information from the Command Register 200 on channel A in sequential order from the least significant bit to the most significant bit. At the end of the 16 clock pulse cycle the Command Register contains the resultant of the combined most significant digits of the position and the tool offset dimensions in straight binary notation. For example, if the most significant digit of the position dimension on the tape was a seven and the most significant digit Tool Offset Thumbwheel Switch was on zero, the command register would indicate a total of seven by a one condition in its least significant bit, a one condition in its next least significant bit, a one in the third least significant bit and a zero in the 13 remaining bits.

The Tape Data Converter and Arithmetic Control Circuit 700 is now ready to receive the information relating to the second most significant digit of the position dimension on tape and the tool offset. When the next digit is advanced under the Tape Reader 410 the digit pulse generated by the Digit Pulse Generator 424 is received on digit pulse line 452 by the Arithmetic Cycle Sequencer 736 which starts the sequence over again.

The AS-1 output opens the ×10 Gates 718 and 720 and closes the Data Gate 722 so that the contents of the Command Register 200 is multiplied by ten as it passes through the ×10 Multiplier 714, the adder-subtractor circuit 716 and back to the Command Register 200. This is done in order to give the proper weight to each digit of the binary code decimal notation information from the tape and the tool offset. For example, the number seven appearing in the command register in straight binary form for the first digit in reality refers to 70 inches of carriage travel from the reference zero although in its present form in the command register it represents seven-thousandths of an inch table travel. This number must therefore be multiplied by 10 thousand or multiplied in the ×10 Multiplier 714 four times in order to give the digit its proper weight. Thus, by multiplying the contents of the Command Register by 10 immediately preceding the reading in of each significant digit from the position dimension on tape and the tool offset, each of the digits will have been given proper weight and the Command Register will indicate the proper number in straight binary code notation after all digits have been entered.

The ×10 Multiplier 714 is a three stage shift register with an input into the first stage and outputs taken from the first and third stages. The output from the first stage represents a times two (×2) multiplication and the output from the third represents a times eight (×8) multiplication. The ×2 stage of the ×10 Multiplier delays the output of the Command Register to the Adder Subtractor one clock pulse and the ×8 stage delays the Command Register output three clock pulses in order to perform the ×10 function. The ×2 and the ×8 output are added in the Adder-Subtractor 716 resulting in a ×10 output which is returned to the Command Register 200. For example, assume that the command register has a one stored therein, represented by a one condition in its least significant bit and a zero condition for each of the other 15 remaining bits. On the first clock pulse $Cl$ 1 of the 16 pulse cycle the one in the least significant bit of the command register 200 is transferred to the input of the ×10 multiplier 714. The output of the ×2 and ×8 stages of the ×10 Shift Register 714 are zero at $Cl$ 1 so that its output is zero and the output of the Adder-Subtractor 716 feeding the input of the Command Register is a zero. On the second clock pulse $Cl$ 2 the one is shifted to the ×2 stage of the Multiplier 714 providing a one output on channel A. The output of the ×8 stage at channel B is again zero so that the output of the Adder-Subtractor at $Cl$ 2 is a one. Clock pulse $Cl$ 2 also shifted a zero which was originally in the second least significant bit position in the Command Register to the input of the ×2 stage of the Multiplier 714. Clock pulse $Cl$ 3 shifts the one from the ×2 stage to the ×4 stage and shifts a zero into the ×2 stage so that the zero output of the ×2 and the ×8 stages cause a zero output to the Adder-Subtractor 716 at $Cl$ 3. Clock time $Cl$ 4 moves the one from the ×4 stage to the ×8 stage of the Multiplier 714 and the zero into the times two stage so that the zero on channel A and the one on channel B provide a one at the output of the Adder-Subtractor to the Command Register. All of the remaining 12 bits in the Command Register to be circulated are zeros so that at the end of the 16th clock time $Cl$ 16 the Command Register has stored therein a zero in the least significant or one bit, a one in the second least significant or two bit, a zero in the third least significant or four bit, a one in the fourth least significant or eight bit, and zeros in all of the remaining bits. This, of course, is the straight binary code notation for the decimal number 10 so that the one originally appearing in the command register has been multiplied by 10.

After the ×10 operation the Arithmetic Cycle Sequencer 736 shifts to its AS-2 output condition to add the next most significant digit from the position dimension information on the tape to the contents of the Command Register 200. The AS-3 condition of the Arithmetic Cycle Sequencer 736 then causes the addition of the next most significant digit and the tool offset dimension to the Command Register.

The cycle is repeated for each of the significant digits of the position dimension and the tool offset dimension, and after each of the significant digits have been entered, the Command Register 200 contains the total combined information of the position dimension and tool offset in straight binary code notation. This information is continuously circulated through the register and around the recirculate loop 740 during each 16 count timing cycle.

After the X coordinate position information has been entered the tape is caused to move to the next section of information which might relate to feed speed or a desired position of the carriage in the Y coordinate. If it is the latter, the Alpha Numeric Character Decoder 412 signals the Y Address Detector 704a to ready the Y Command Register 200a for receipt of the information. Also the detection of the alpha character causes an alpha reset pulse to be generated on conductor 434 to turn off the X Address Detector 704 which in turn closes the Coordinate Selector Gate 734 and shifts the Coordinate Selector Gate 732 to close the gate to the arithmetic loop line 738 and open the gate to the recirculate loop line 740. The Y position dimension information and the tool offset information are then read into the Y Command Register in the same manner as hereinbefore described for the X Command Register, and the X Command Register is maintained in synchronism therewith by shifting its information around the recirculate loop 740.

At the conclusion of the Y information cycle, the receipt of an alpha reset pulse from the detection of the next function in the tape block turns off the Y Address Detector and causes the information therein to be circulated around the Y recirculate loop 740a. The information in the Command Registers 200 and 200a is then circulated in synchronism with each other and the code bits are in their proper sequence within their respective registers at the end of the 16th bit of each 16 clock pulse cycle.

READ IN LOGIC CIRCUITS—FIGS. 16, 17 AND 17A

Figure 17A:
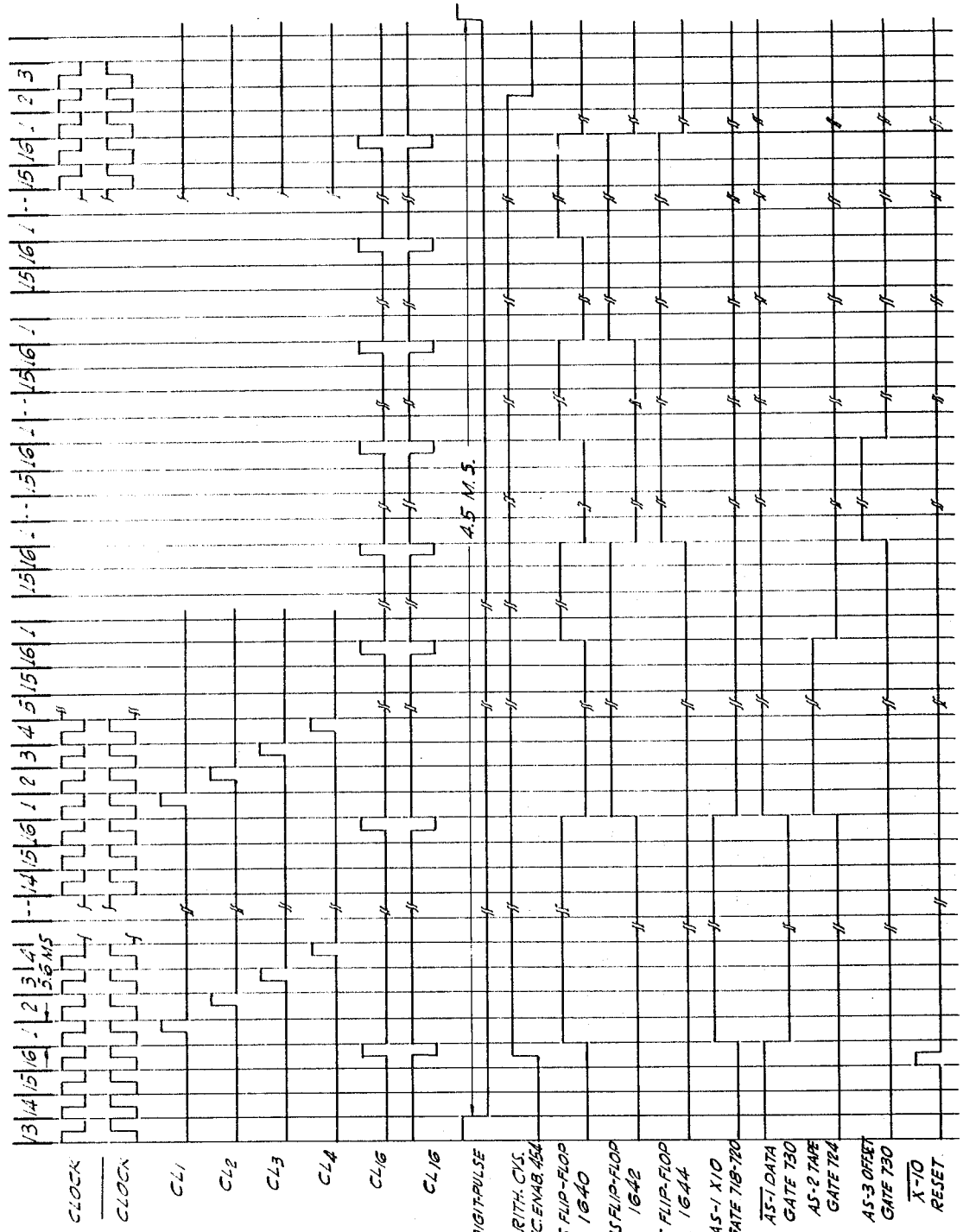
FIG. 17A is a diagram of the timing signals of various elements providing the logic timing cycles.

The read-in of the desired position information from the tape and the tool offset information from the thumb wheel switches will now be described in detail with specific reference to the circuit diagrams shown in FIGS. 16 and 17 arranged in the manner shown in FIG. 19a. Reference will also be made to the pulse timing waveforms shown in FIG. 17A.

The read-in of the desired position and tool offset information begins with the G function number on the tape which indicates whether the tool offset for the particular process steps is to be in a positive or negative direction from the reference zero. When the alpha character G is read from the tape a positive voltage is placed on the control gate 1602 of a silicon controlled switch (SCS) 1604 by a G or Tool Offset Detector (not shown) triggering it into conduction. The G or Tool Offset Address Detector 702 is similar to the X Address Detector 704 which will be described in detail hereinafter. The conducting anode 1606 of the SCS 1604 is connected through resistor 1608 and conductor 434 (FIG. 17) to the alpha reset generator 432 and the control anode 1610 is connected through resistor 1612 to a positive voltage source. Transistor 1614 which has its collector 1616 connected to a high voltage source (not shown) in nand gate 1618 is normally conducting until the G function SCS 1604 is turned on shorting the base 1618 to ground. A high is thus presented on the third input to the nand gate 1618 when the alpha character G is detected.

It is to be noted as a matter of clarification that inputs to the various nand gates in this description will be referred to by number sequentially from the top input to the bottom input but the inputs are not numbered on the diagrams for lack of space. Thus, transistor 1614 is connected to the third input of nand gate 1618 while transistor 1620 is connected to the second input and transistor 1622 is connected to the first input.

The transistor 1620 has its input connected to the digit 1 output of the Digit Shift Register 426 which is normally high but is low when the first digit is to be strobed. Transistor 1620 is thus cut off during the digit 1 pulse and the second input of nand gate 1618 goes high. The input to the transistor 1622 is connected through a negator 1624 to the number 4 line of the 10 line conductor from the Numeric Character Decoder 422 so that the detection of the numeric character 4 causes the first input of nand gate 1618 to go high. The low at the output of nand gate 1618, resulting from the three high inputs sets the tool offset sign control flip-flop 1626 and the tool offset load gate control flip-flop 1628. These flip-flops are simple R-S types formed by typical nand gates such as may be fabricated by integrated circuit processes along with the other nand gates throughout the circuit. The setting of flip-flop 1628 produces a high on its output conductor 1630 to the tool offset strobe gates 728 in preparation for the receipt of tool, offset data from the thumb wheel switches 2000.

When the tape reader reads the second digit of the tool offset function number transistor 1632 places a high on the second input to nand gate 1634. The third input of nand gate 1634 is already high from the detection of the alpha character G. Its first input, however, is tied to a transistor 1636 which causes it to go high if, but only if, the second numeric character of the G function is a three. The output of the nand gate 1634 then goes low to reset the tool offset sign flip-flop 1626. This places a low on conductor 1638 and causes the full Adder-Subtractor 716 to combine the tool offset information with the tape position information in the proper manner for positive direction tool offset. If, however, the second digit of the tool offset G function is a four, transistor 1636 maintains a low at the first input to 1634 so that flip-flop 1626 remains in the set condition established by the first G number digit four. The Add-Subtract Detector 746, therefore, detects the high on line 1638 and sets the Full Adder-Subtractor 716 to subtract the tool offset. The flip-flops 1628 and 1626 are maintained in their G function conditions until the information from the X and/or Y coordinates have been read into the logic. At that time a low is placed on the X and Y reset conductor 1640 to properly reset the flip-flops. The production of the low on the X and Y reset line 1640 will be discussed later.

After the tool offset direction information has been read into the logic, the circuit is ready to receive the position information from the tape and the tool offset thumb switches. This is initiated by the detection of an alpha character X or Y. For the purposes of this description, a desired movement in the X coordinate only will again be assumed.

When the alpha character X is read by the Tape Reader 410 a high appears on each of the three lines 418c (FIG. 17) from the output of the Alpha and Numeric Character Decoder 412. The highs on these three lines are "Anded" with a positive going P1b pulse on line 421 from the Character Read Pulser 420 to produce a positive signal on the control gate 1702 of SCS 1704. SCS 1704, is thus triggered to its on condition.

It is to be noted at this time that all of the Function Address Detectors throughout the control are essentially of the same type with the conductor inputs "Anded" with a P1b pulse to trigger on a silicon-controlled switch. The silicon-controlled switch 1604 of the Tool Offset Address Detector 702 corresponds to the SCS 1704 of the X Address Detector 704 and SCS 1704a (FIG. 17) of the Y Address Detector 704a. The control anode 1706 of the SCS 1704 is connected through a resistor 1708 to a positive voltage source and each of the other Function Address Detectors have their respective control anodes correspondingly connected. The conduction anode 1710 of SCS 1704 is connected through a resistor 1712 to the alpha reset line 434 leading from the Alpha Reset Generator 432. The conduction anodes of the SCS's for the other Function Address Detectors are also correspondingly connected to the alpha reset line 434.

The purpose of the alpha reset is to turn off all Function Address Detectors except the one corresponding to the alpha character being read by the tape reader. This is accomplished in the following manner. For example, when SCS 1704 is switched on by the detection of the X character on the tape, the Alpha Reset Generator 432 causes the voltage on alpha reset line 434 to momentarily drop to zero, and cut off all of the silicon-controlled switches in the Function Address Detectors including SCS 1704 and SCS 1604. When the positive voltage is restored on the alpha reset line 500 microseconds later, only SCS 1704 will re-trigger into conduction, because it is the only one that has a positive voltage remaining on its control gate 1702. All of the other SCS's including SCS 1604 have their control gates at ground potential by the action of the And gates at the input of the respective alpha character detectors when they are not being addressed.

The Alpha Reset Generator 432 operates in the following manner to produce the 500 microsecond low voltage pulse on the alpha reset line 434. The silicon-controlled switch 1714 is normally in a non-conducting condition with positive voltage being supplied from the 24 volt source through resistor 1715, diode 1716 and alpha reset line 434 to the control anode 1718 of the SCS 1714. Approximately 10 volts appear on the conduction anode 1720 of the SCS by means of the voltage dividing circuit from the 24-volt source including resistor 1715, diode 1716, alpha reset line 434, resistor 1722, resistor 1724, diode 1726 and resistor 1728 to the 10-volt source. The alpha reset SCS 1714 is triggered on, however, when SCS 1704 in the X Address Detector triggered into conduction. The increased load caused by the conduction of that SCS reduces the voltage on the alpha reset line 434 and, hence, the control anode 1718 falls below the voltage on the conduction anode 1720 of SCS 1714, triggering it into conduction. SCS 1714 remains in conduction until capacitor 1730 charges to produce a reverse voltage across the SCS via diode 1726 and resistor 1732. The resistor and capacitor values are selected in order to provide a 500 microsecond cycle time and, hence, the alpha reset line is essentially grounded through the conducting SCS 1719 for that period of time.

Returning now to the X position data read in, when X detector SCS 1704 fires, a conduction circuit for transistor 1734 is provided from plus voltage at the input of gate 1762, conductors 1763 and 1742, transistor 1734, diode 1738, conductor 1740, control anode 1706 of SCS 1704 to ground. Conductor 1742 connected to the collector of transistor 1734 thus goes low causing nand gate 1744 of the Coordinate Selector Gate 732 to close to interrupt the recirculate loop 740. The low on conductor 1742 also opens nand gate 1746 of the Coordinate Selector Gate 732 to connect the output of the X Command Register 200 to line 738 in the arithmetic loop 712 as previously described in the discussion of the Tape Data Converter and Arithmetic Control Circuit of FIG. 7.

Also, as previously described, the Coordinate Selector Gate 734 is maintained closed for a period of approximately 500 microseconds after the opening of gate 732 to permit the X Command Register to be cleared to read all zeros. The low on line 1742 indicating the detection of the X character prepares Coordinate Selector Gate 734 by providing a high through negator 1743 at the third input to nand gate 1748. But gate 1748 is not ready to pass the information on line 717 from the arithmetic loop to the input of the Command Register until the first input of nand gate 1748 also goes high. This signal is provided over conductor 1758 by the Alpha Reset Line Circuit 1750 which includes transistor 1752. Transistor 1752 has its base connected through an RC network 1754 and diode 1756 to the alpha reset line 434. Thus, when the alpha reset line 434 goes low from the detection of the X character, the transistor 1752 remains conducting for approximately 30 microseconds, at which time it cuts off. Transistor 1752 remains cutoff until the alpha reset line 434 returns to its normal positive voltage when transistor 1752 again begins to conduct to provide a high on the alpha $R_L$ line 1758 leading from the output of negator 1760. The Nand gate 1748 thus is opened for 500 microseconds during which time zeros are read into the Command Register 200.

The arithmetic circuits are now ready to receive the numerical data pertaining to the desired carriage position and tool offset, perform the necessary arithmetic computation and store the combined data in the Command Register 200. After the X character prepares the circuits the tape moves to replace the alpha character X under the tape reader 410 with the most significant digit of the desired carriage position dimension. A digit pulse is generated on digit line 452 (FIG. 16) responsive to the detection of any numeric character 0 through 9 and is provided to the Arithmetic Sequence Enabler 754. The Arithmetic Cycle Sequencer 736 on the first clock 16 ($\overline{Cl}$ 16) pulse from the 16 Counter 710, which remains until the end of one complete arithmetic cycle as seen in the timing diagrams of FIG. 17A.

The Arithmetic Cycle Sequencer 736 is made up of three toggle flip-flops 1640, 1642 and 1644 which are connected to form a simple counter responsive to not clock 16 ($\overline{Cl}$ 16) pulses from the 16 Counter 710. The flip-flops depicted are integrated circuits of any well known type such as Siliconix Inc. Type SA43A. As may be seen in the timing diagrams of FIG. 17A, each of the flip-flops are in their low state (low Q output) prior to the receipt of the digit pulse. On the first receipt of a $\overline{Cl}$ 16 pulse the first flip-flop 1640 is flipped to its high state (high Q output). The next $\overline{Cl}$ 16 pulse sets the flip-flop 1640 to its low state which in turn causes the second flip-flop 1642 to go to its high state. The next $\overline{Cl}$ 16 pulse triggers the first flip-flop to its high state again, the second one to its low state and third one to its high state. This continues until all of the flipgflops are returned to their low states at which time the Arithmetic Sequence Enabler 754 is caused to remove positive enabling voltage to the first flip-flop 1640. This is accomplished by Anding the appropriate flip-flop outputs to indicate each of them in the low state as is well known in the art, and these connections are not shown in the drawings.

It may be seen from the connections shown in FIG. 16 that the ×10 Gates 718 and 720 are maintained opened by nand gates 1641, 1643 only when the flip-flop 1640 by itself is in its set condition. On the other hand Data Gate 722 is always open except for the period when flip-flop 1640 by itself is in its set condition. The set condition of flip-flop 1640 is the 16 count AS-1 condition previously mentioned in the description of FIG. 7. The Tape Data Gate 726, it may be seen, is opened during the next cycle of 16 counts when only flip-flop 1642 is in its high state. This is the AS-2 condition previously described. The Tool Offset Data Gate 730 is opened when only the third flip-flop 1644 is in its on state. As may be seen in the timing diagrams, this occurs 16 counts after the end of the AS-2 condition. In other words, whereas the AS-2 condition follows the AS-1 condition immediately, the AS-3 condition is initiated 16 counts after the conclusion of the AS-2 condition. This skipped cycle of 16 counts permits an end around carry function under certain conditions when subtraction and/or negative numbers are being used in the program. It will be noted from the timing diagram that three cycles of 16 counts occur after the conclusion of the AS-3 condition before the arithmetic cycle sequence stops, which enables an end around carry function if necessary after the tool offset digit has been read in.

The Clock 708 and 16 Counter 710 provide the timing for all of the logic functions in the control. The Clock 708 is a self-oscillator of any well known type and produces a pulse approximately every 5.6 microseconds on line 1648 in the described control. The 16 Counter 710 is a simple counter similar to the counter comprising the arithmetic cycle sequencer 736 but includes four toggle flip-flops (not shown). The addition of the fourth flip-flop causes a total cycle of 16 counts for the counter 710 whereas the Arithmetic Cycle Sequencer 736 recycles in eight counts because it only has three flip-flops. An output for each of the first four pulses as well as the last pulse is provided and these are the $Cl\ 1$, $Cl\ 2$, $Cl\ 3$, $Cl\ 4$ and $Cl\ 16$ pulses discussed herein. The $\overline{Cl}\ 16$ pulse is provided by merely negating the $Cl\ 16$ output with negator 1646.

The $Cl\ 1$ through $Cl\ 4$ pulses are used to strobe the Tape Data Strobe Gate 724 and the Tool Offset Strobe Gate 728. The desired position information from the tape is received at the Strobe Gate 724 in the form of parallel received pulses on the binary weighted bit lines 436-1, 436-2, 436-4 and 436-8 from the Tape Data Inverter 416. These parallel received bits are converted to serial pulses by the $Cl\ 1$ through $Cl\ 4$ pulses and delivered to the Tape Data Gate 726. The Tool Offset Strobe Gate 728 similarly strobes the information on the binary weighted bit lines 808-1, 808-2, 808-4 and 808-8 to provide the information in serial pulse form to the Tool Offset Data Gate 730. Although the serial pulses from the Strobe Gates 724 and 728 are presented to the respective Data Gates 726 and 730 each time the 16 Counter 710 cycles through its 16 counts, the information is passed through those gates to the B channel input of the full Adder-Subtractor 716 only during the respective AS-2 and AS-3 periods of the Arithmetic Cycle Sequencer 736.

The X Command Register 200 (FIG. 17), which is constantly pulsed by clock pulses on line 1648 from the clock 708, continuously circulates its contents from its output on line 738 and through Data Gate 722 to the A input 719 of the Full Adder-Subtractor 716, except when the Arithmetic Cycle Sequencer is in its AS-1 condition indicating the ×10 operation. Thus, during the AS-2 and AS-3 periods the information from the tape and the tool offset is respectively added to the contents of the Command Register and returned thereto through conductor 717.

Figure 10:
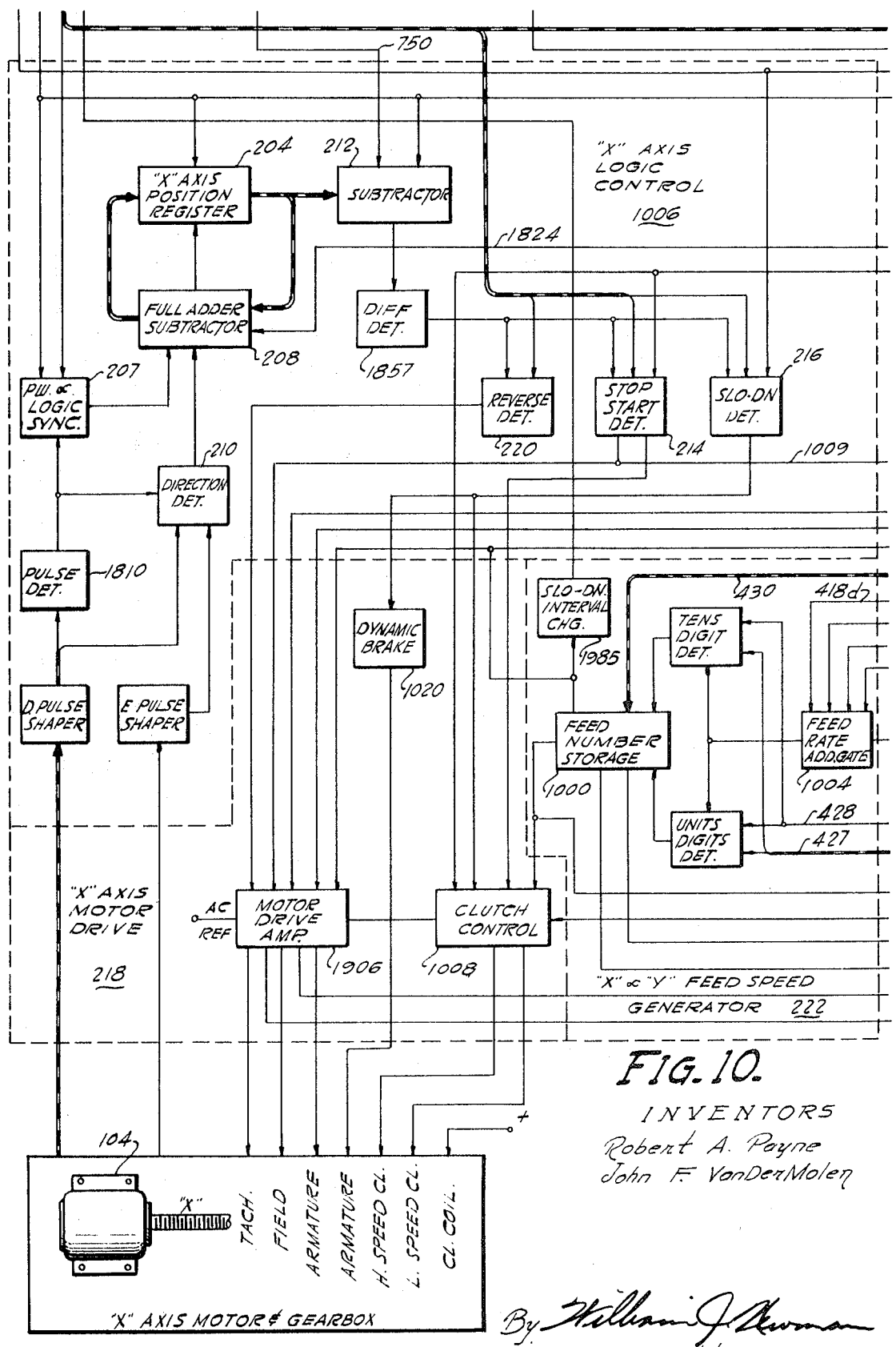
Figure 11:
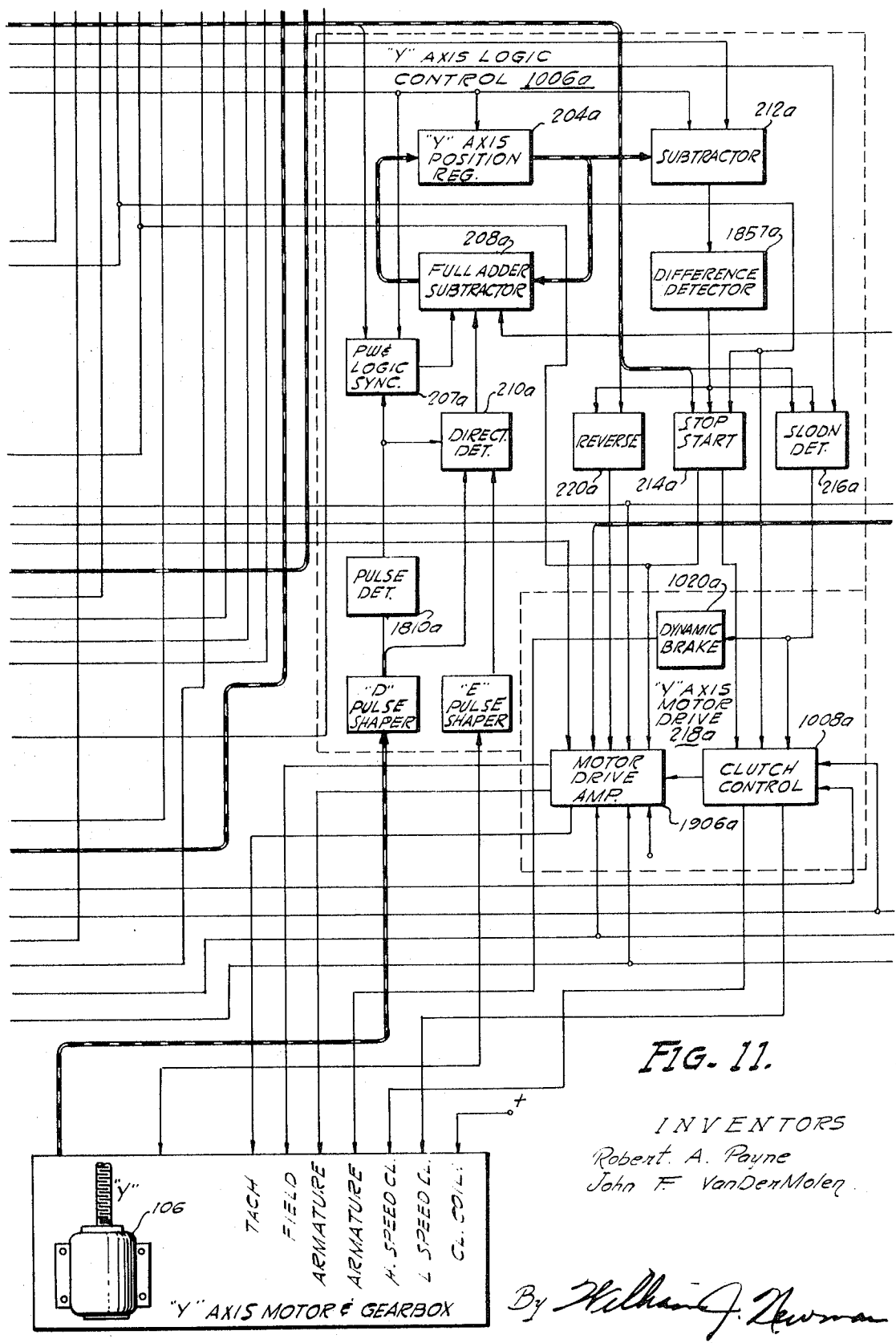

The Command Registers 200 are made up of 16 serially connected toggle flip-flops 1760a through 1760p, each of which represents a weighted digit in binary code notation. Thus, the last stage of the register from which the output is taken, represents the $2^0$ digit whereas the input stage 1760p designates the $2^{15}$ digit. These flip-flops are the same type used in the Arithmetic Cycle Sequencer 736. In the circuit as connected in FIG. 17 the flip-flops in the register indicate the presence of a particular digit when the Q output is in the low state and the $\overline{Q}$ output is in the high state. The negators 1762 and 1764 provide the proper signals to the arithmetic loop line 738 and to the lines 750 leading to the X Axis Logic Control Circuit 1000 (FIG. 10).

After the final digit of the desired position dimension from the tape has been entered into the arithmetic circuits and the tape is driven to the next function block (such as, for example, carriage feed speed or Y position), the detection of the next alpha character indicating that function (such as F for feed speed or Y for Y coordinate positive) causes the Alpha Reset Generator 432 to generate an alpha reset pulse which turns off the silicon-controlled switch 1704 in the X Address Detector 704. When the X Address Detector SCS 1704 is turned off Coordinate Selector Gate 734 is closed by action of nand gate 1748 to prevent any further information to be read into the X Command Register 200 from the arithmetic loop. Coordinate Selector Gate 732 is also fixed to prevent the contents of the Command Register from being shifted to the arithmetic loop 712 by action of nand gate 1746 and opens the recirculate loop 740 by means of nand gate 1744. Since the X Command Register 200 is continually pulsed by the clock pulses, the contents therein are continuously recirculated over the recirculate loop 740 from the output back into the input.

When the SCS's 1704 and 1704a are both turned off, indicating the end of all the position data on the tape, the transistors 1734 and 1734a in the detector circuits are biased off so that the first and second inputs of nand gate 1762 tied to the collectors of the transistors via conductors 1763 and 1765 are high. When the $\alpha$ RL pulse is received from the collector of transistor 1752 30 microseconds after the receipt of the alpha reset pulse which turned off the X and/or Y detectors, the nand gate 1762 is opened to provide a low to the tool offset sign flip-flop 1626 and the tool offset load flip-flop 1628 to reset them to their normal condition.

The transistors 1734 and 1734a draw their collector currents from the nand gates they precede. The backward connected diode 1736 to the plus 5 voltage source acts as a clamp to protect the nand gates. The transistors 1734 are in the circuit because of the long turn off time of an SCS compared to its turn on time. If Y information immediately follows the X information it might get read into the X information because of the slow turn-off time of the SCS 1704. With the base of transistor 1734 connected through a resistor to the control anode of the Y detector SCS1704a, it will be caused to turn off immediately upon the triggering of SCS 1704a rather than on the shut-off of SCS 1704.

POSITION AND LOGIC CONTROL CIRCUITS—FIGS. 18 AND 19

FIGS. 18 and 19 show the position and logic control circuits by which the actual position of the milling machine is indicated in the Position Register 204 and compared with the combined desired position information from the Command Register 200. The difference between the actual position of the machine carriage and the combined desired position is used to control the carriage drive motors to move the carriage to the proper position. The circuits provide a digital feed back servo loop in which the accuracy of the circuits is absolute, and the accuracy of workpiece reproduction is based solely on the mechanical elements of the machine tool.

Figure 21:
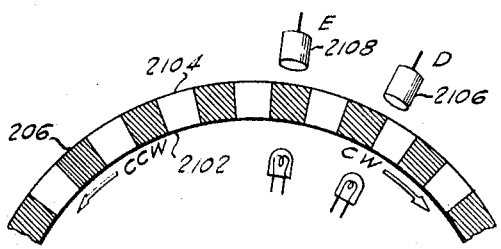
FIG. 21 is a schematic representation of a portion of the Pulse Wheel and Pulse Wheel detector.

Since the information in the Command Register 200 relating to the desired carriage position is synchronized with the clock pulses of the Tape Data Converter and Arithmetic Control Circuit 700, the information in the Axis Logic Control Circuits 1006 must also be synchronized therewith. As will be recalled in the general description of the circuit relating to FIG. 2, the information relating to the actual carriage position is read into the control circuit by means of a data element such as pulse wheel 206. The pulse wheel rotates with the coordinate axis lead screw of the machine and includes means for generating pulses responsive to the amount of rotation of the pulse wheel. For example, in the apparatus constructed in accordance with the teachings of this invention, the lead screw of the milling machine has a thread pitch of 0.250 inch and the pulse wheel is designed to produce 250 pulses per revolution in the circuits that follow. Thus, each pulse represents a movement of 0.001 inch. FIG. 21 of the drawings shows a fragmented portion of a pulse wheel 206 having alternate opaque and transparent portions 2102 and 2104. The photocells 2106 and 2108 view the opaque and transparent portions and produce signals as they pass by. Thus, the output of each of the photocells will have a low output when viewing one portion and a high output when viewing the other portion. Each shift from a low to a high, or vice versa, indicates a movement of the carriage of 0.001 inch.

The two photocells 2106 and 2108 are used rather than a single cell in order to determine the direction of rotation of the pulse wheel 206 in a manner to be hereinafter described. To facilitate the description of the Direction Detector 210 in the later description, the output from the photocell 2106 will be designated D and the output from the photocell 2108 will be designated E.

For the purposes of data read-in from the pulse wheel 206 the D output from photocell 2106 only is used. The pulse signal is attenuated across a calibration potentiometer 1802 (FIG. 18) and transmitted through three nand gates 1804, 1806 and 1808 to a pulse shaping circuit 1810 which provides a 10 microsecond low pulse to the first input of nand gate 1812 when the D output from photocell 2106 goes from low to high. Since both inputs to the nand gate 1812 are both normally high, a 10 microsecond high pulse is thereby produced at the output of 1812 feeding nand gate 1814. The pulse shaping circuit 1810a, fed from the output of nand gate 1806, provides a 10 microsecond low pulse to the second input of nand gate 1812 when the D output of photocell 2106 goes from high to low indicating the next 0.001 inch increment of pulse wheel movement. These pulses are then synchronized with the logic of the control system by the Pulse Wheel and Logic Sync. Circuit 207.

The 10 microsecond high pulse from the output of nand gate 1812 is anded with the 200 KC clock pulses from the clock 708 so that a low going pulse synchronized with the clock pulse is provided at the output of the NAND gate 1814. This low going pulse sets the R-S flip-flop 1820 to provide a high to the second input of nand gate 1822. This high is anded with the next $Cl$ 1 pulse from the 16 Counter 710 to provide an input count pulse to the Full Adder-Subtractor 208. This pulse is added to the count registered in the Position Storage Register 204 which is constantly being circulated through the Full Adder-Subtractor 208 by the clock pulses in a manner similar to that described for the Command Register 200.

Figure 21B:
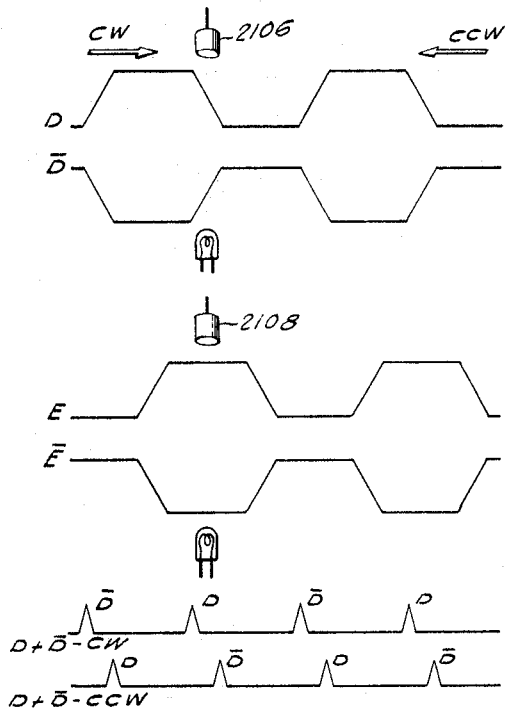
FIG. 21b is a diagram of the timing signals for the Pulse Wheel Direction Detector for determining the direction of carriage movement.
Figure 21A:
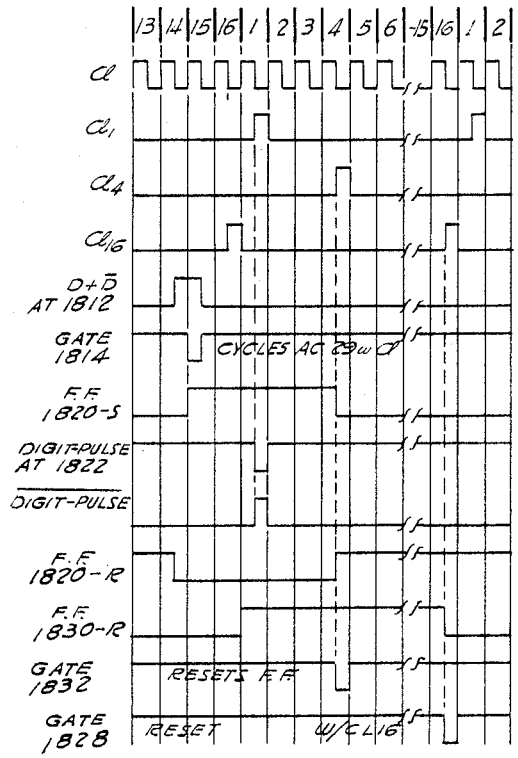
FIG. 21a is a diagram of the timing signals for the Pulse Wheel and Logic Synchronization circuit.

It is to be understood that the repetition frequency of the pulse wheel signals is substantially lower than the repetition frequency of the 16 count timing cycles, even for the fastest feed speed of the carriage. Therefore, with the synchronizing circuit shown each pulse wheel pulse is entered once, but only once, into the Position Storage Register 204. The timing diagrams for the pulse wheel synchronizing circuit are shown in FIG. 21a.

In order for the next succeeding pulse to be registered the R-S flip-flop 1820 must be reset after each received pulse from the pulse wheel. A reset pulse is therefore applied to the R-S flip-flop 1820 on conductor 1826 from the circuit including nand gate 1828, flip-flop 1830 and nand gate 1832. Ordinarily the R-S flip-flop 1830 is in its set condition with a low output to the second input of nand gate 1832 because of the normally high second input to nand gate 1828 and the high going clock 16 pulses to the first input of nand gate 1828. Thus, with no pulses being received from the pulse wheel, flip-flop 1830 is normally in its set condition with a low provided to nand gate 1832. When a pulse wheel signal is received, however, the low going pulse from the output of nand gate 1822 resets the flip-flop 1830 at clock time $Cl$ 1 to provide a high to the second input of nand gate 1832. This is anded with a $Cl$ 4 pulse which then provides the reset pulse at $Cl$ 4 time to the flip-flop 1820. The second input to nand gate 1828 therefore goes high and on the next clock 16 pulse a set pulse is delivered to flip-flop 1830 to return it to its normally set condition. The circuit is now ready to receive the next pulse wheel pulse which would be indicated by the D output of photocell 2106 going from a high to a low. Pulse shaping circuit 1810a thus provides the negative going 10 microsecond pulse to nand gate 1812 of the Pulse Wheel and Logic Sync Circuit 207 to cause another count to be combined with the contents of the Position Register 204 in the same manner.

The Position Storage Register 204 is set to all zeros when the carriage has been set to its reference zero position at the start of the tape program as previously discussed with respect to the program shown in FIGS. 3 and 3a. This is accomplished by setting the Reference Zero Switch 2004 (FIG. 20) momentarily to the proper coordinate axis designation. This provides a signal on conductor 1824 (FIG. 18) to the Adder-Subtractor 208 which then causes zeros to be read into all of the shift register stages of the Position Storage Register 204. When the carriage begins to move away from the zero reference responsive to the tape program, each pulse from the D output photocell 2106 is read into the Position Storage Register 204 on the clock $Cl$ 1 pulse as described. The contents of the Position Storage Register 204 is thus an accurate count of the position of the carriage from the reference zero position in the particular coordinate axis.

The Direction Detector 210 determines whether the pulses from the pulse wheel 206 are to be added to or subtracted from the contents of the position register which is dependent upon the direction of carriage travel with respect to the reference zero position. The direction of travel may be determined by the time sequence by which the D and E signals are produced by the respective photocells 2106, 2108. The D and E signals from the photocells 2106 and 2108, respectively, are high when they view an opaque portion 2102 on the pulse wheel and low when viewing a transparent portion 2104. A D pulse occurs when the pulse wheel moves from a transparent portion 2104 to an opaque portion so that the cell output goes from low to high. Conversely, a not D ($\overline{D}$) pulse occurs when the pulse wheel moves from an opaque portion to a transparent section so that the cell output goes from high to low. The D, $\overline{D}$, E and $\overline{E}$ signals will appear on conductors 1834, 1836, 1838 and 1840 (FIG. 18), respectively, in accordance with the waveforms shown in FIG. 21b. These signals are anded together in all combinations by the nand gates 1842, 1844, 1846 and 1848 with the various outputs therefrom feeding either the set inhibit or reset inhibit of the direction flip-flop circuit 1850.

The flip-flop 1850 is enabled by the output of nand gate 1812 which produces a positive going pulse when the D signal goes from low to high (D) or from high to low ($\overline{D}$). The flip-flop 1850 is then triggered by the flip-flop 1820 so that the D and E combined signals are synchronized with the D and $\overline{D}$ pulses to cause the flip-flop 1850 to select the proper output for clockwise or counterclockwise movement, and thus cause the full Adder-subtractor 208 to add or subtract the pulse wheel pulses to the position register 204.

The logic of the Direction Detector is based on the fact that when the pulse wheel 206 is moving in a clockwise direction the output of the D photocell 2106 lags the output of the E photocell 2108, whereas, when the wheel 206 is moving in the counterclockwise direction the output of the D photocell 2106 leads the output of the E photocell 2108. The direction detector determines this by reading the condition of the D and E photocells in synchronism with the production of the D and D pulses. Thus, the waveforms of FIG. 21b show that when the wheel is moving in a clockwise direction (which may be thought of as the D & $\overline{D}$ waveforms moving towards the right with respect to the photocells 2106, 2108 in FIG. 21b), the D and E outputs are high on a D pulse at the output of nand gate 1812 and are both low at the time a $\overline{D}$ pulse is generated. For the counterclockwise movement of the pulse wheel (which may be thought of as the D & E waveforms moving towards the left with respect to the photocells) the D output is high and the E output is low at the time of a D pulse from nand gate 1812 while the E output is high and the D output is low when a $\overline{D}$ pulse is generated by nand gate 1812.

The nand gates 1842, 1844, 1846 and 1848 read the conditions of the D and E photocells to provide the proper conditioning signals to the flip-flop 1850. These are anded with the D and $\overline{D}$ pulses from nand gate 1812 at the input to the flip-flop 1850, so that it is set to its clockwise or counterclockwise condition and provides the proper signals through conductors 1852 and 1854 to the Full Adder-Subtractor Circuit 208. The D pulse which has been synchronized with the clock timing of the control system by the Pulse Wheel and Logic Sync Circuit 207 is thus added to or subtracted from the contents of the Position Register 204.

STOP-START, SLOW DOWN AND REVERSE CIRCUITS—
FIG. 18

The Stop-Start Detector 214 prepares the Motor Drive Circuit 218 for moving the machine carriage in the following manner. The Full Subtractor 212 provides the comparison between the desired position information in the Command Register 200 with the actual carriage position information in the Position Register 204. The data from the Command Register is supplied to the Subtractor Circuit 212 on lines 750, and the data from the Position Register 204 is received on lines 1856. Both the Q and $\overline{Q}$ outputs of the last stages of the Command and Position Registers are used to facilitate the logic in the Subtractor Circuit 212 in a well known manner. The Circuit 212 is of a standard type, and the provision of both the Q and $\overline{Q}$ outputs enables the use of less logic elements within the circuit.

Figure 21C:
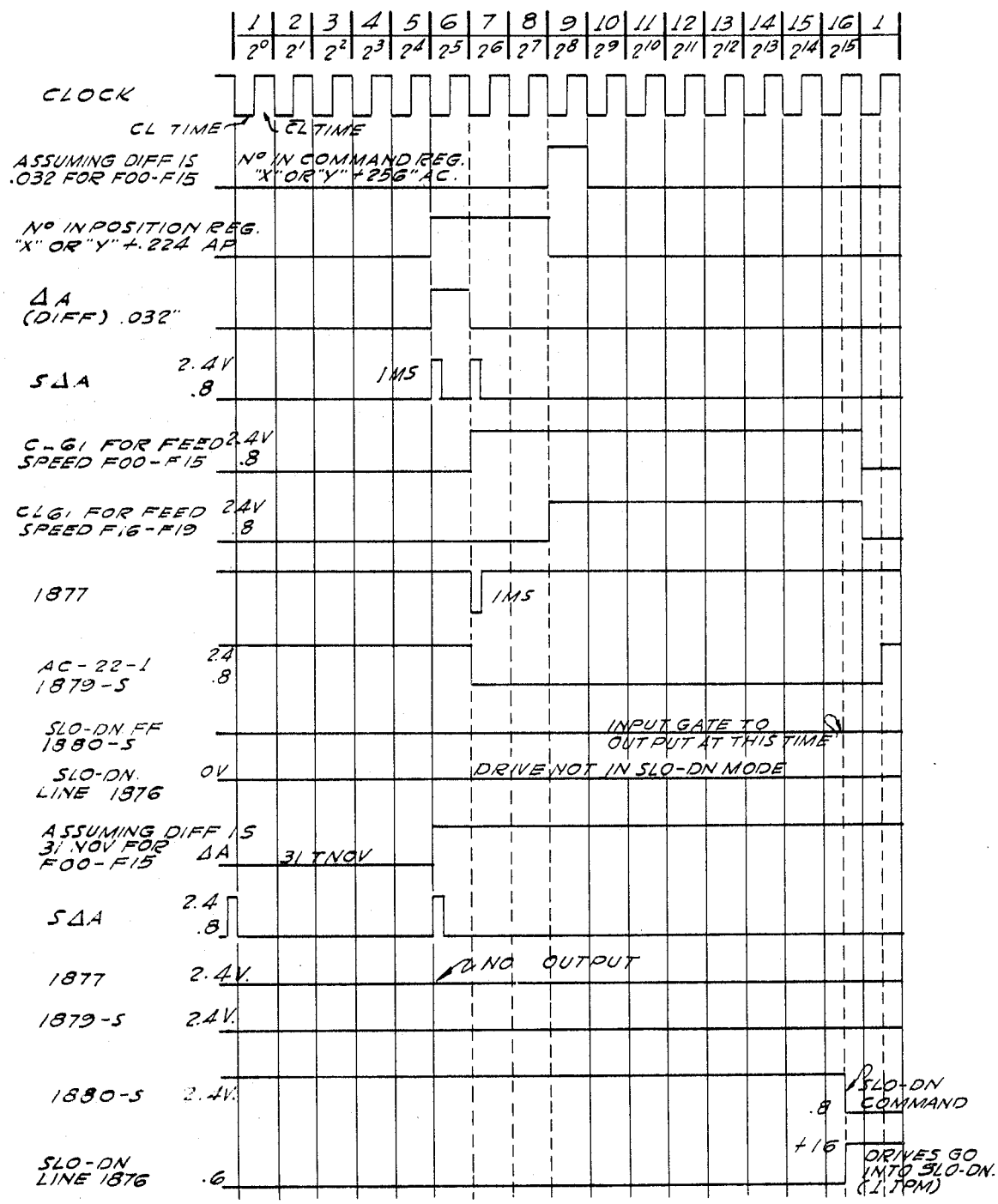
FIG. 21c is a diagram of the timing signals for the Carriage Slow Down circuits.

The output of the Full Subtractor Circuit 212, which will hereinafter be referred to as delta A ($\Delta A$) is thus a signal (see FIG. 21c) spaced over the period of the recirculating 16 clock pulse cycle having high or low voltage levels during particular bit periods to represent in binary code notation the difference between the desired position of the carriage and the actual position of the carriage. The binary code number represented by the high and low going voltage level signal represents the actual dimension in 1,000ths of an inch that the machine carriage is from its desired position.

The $\Delta A$ signal is received by Difference Detector 1857 where it is inverted by nand gates 1858, 1859 and differentiated by R-C circuits 1860 and 1861, respectively, to provide a positive going 1 microsecond pulse at the output of nand gate 1862 each time the $\Delta A$ signal either goes high or goes low. The signal at the output of nand gate 1862, which will hereinafter be referred to as S delta$\Delta$ (S$\Delta A$) is applied through conductor 1863 to the set input of set-reset flip-flop 1864. The reset input of flip-flop 1864 is pulsed on the clock Cl 16 pulse of every clock cycle so that if no pulses appear on conductor 1863 to the set input during a cycle the flip-flop 1864 remains in its reset condition. As long as the flip-flop 1864 remains in its reset condition the flip-flop 1865 remains in its reset condition with a low at its Q output. Transistor 1866 is in a low state which in turn maintains transistor 1871 in its non-conducting state so as to indicate a stop condition on line 1873 leading to the Axis Motor Drive Circuit 218 (FIG. 19).

When desired position data (not equal to the actual position data) is read into the Command Register 200 and compared with the data in the Position Register 204 to provide a $\Delta A$ signal output from the Subtractor 212, at least one S$\Delta A$ pulse is provided during each 16 bit clock cycle which triggers flip-flop 1864 to its set condition. On the leading edge of the next clock 16 pulse after an S$\Delta A$ is generated the flip-flop 1865 is changed to its set condition and stays in that condition as long as flip-flop 1864 detects at least one S$\Delta A$ pulse during succeeding 16 count timing cycle. The set condition of flip-flop 1865 places a high input to transistor 1866 rendering it conductive through the circuit from 5 volts, transistor 1866, resistor 1867 and the parallel paths to minus 3 volts through resistors 1868, diodes 1869 and resistors 1870. Current flow through these paths places a positive voltage at the inputs to the Stop and Start transistors 1871 and 1872 respectively, which causes them to conduct to place low voltage on the respective Stop and Start conductors 1873 and 1874 to the Motor Drive Circuit 218 to actuate carriage movement. The manner in which these stop and start signals actuate the Motor Drive Circuit to cause carriage motion will be described hereinafter.

The Stop and Start transistors 1871 and 1872 will remain conducting until the difference signal $\Delta A$ from the Full Subtractor 212 designates a zero difference between the information in the Position Register 204 and the Command Register 200. This is represented by the appearance of no voltage changes in the $\Delta A$ signal during the 16 count timing cycle. No S$\Delta A$ pulses are generated at the output of nand gate 1862, and the flip-flop 1864 therefore is not switched to its set condition during the timing cycle. At the next clock Cl 16 pulse, the flip-flop 1865 returns to its reset condition because of the high at its set inhibit input from the $\overline{Q}$ output of flip-flop 1864 so that its Q output goes low and turns transistor 1866 off. Positive voltage is therefore removed from the inputs of Stop and Start transistors 1871 and 1872 causing them to cut off and signal the Axis Motor Drive Circuit 218 to stop movement of the carriage.

It will be recalled that the tool carriage is not permitted to move until all of the information for a particular process step has been read into the logic circuits from the tape. Further, it will be recalled that the end of the tape information for the process step is indicated by an EOB character at the end of the block of information. The EOB signal line 440, which is connected to the base of transistor 1875 through diode 1875a and resistor 1875b, ordinarily has high voltage thereon which maintains transistor 1875 in a conductive condition. The conduction path for transistor 1875 runs from ground through the transistor 1875, resistors 1867 and 1868, transistor 1866 to positive 5 volts. The low voltage on the collector of transistor 1875 inhibits the conduction of Stop and Start transistors 1871 and 1872 until the EOB line 440 goes low responsive to the EOB character on tape. It is to be noted, however, that the transistor 1866 connected to the output of flip-flop 1865 is triggered to its conductive state before the receipt of the EOB character signal on line 440 as the Subtractor circuit 212 begins comparing the contents of the position storage 204 with the information in the Command Register 200 as soon as the tape information has been read into the Command Register 200. Thus, the logic circuits are all ready to drive the motor control circuit 218 as soon as all of the process step information has been read into the control as signified by the EOB character on the tape.

The Slow Down Detector 216 provides for a reduced carriage feed speed when the target point is approached to prevent overshoot of the position. The S$\Delta A$ signal at the output of nand gate 1862 is used by the Slow Down Detector 216 to indicate that the carriage is a predetermined distance from the target point, thus calling for the reduced feed speed. In designing the control system it was determined that the carriage motion should be slowed down to a travel speed of approximately one inch per minute when the carriage reaches a point 0.031 inch before the desired end position if the programmed feed speed is in the range of 1.8 to 120 inches per minute as represented by the tape speed number F1 through F15. A longer slowdown distance of 0.127 inch is used for the high feed speed range represented by speed numbers F16 through F19. The Slow Down Detector 216 detects when the difference between the data of the Position Register 204 and the Command Register 200 drops below 32 or 128 and provides a signal on slowdown conductor 1876 to cause the Motor Drive Circuit 218 to slow down the carriage movement.

For the lower speed range a nand gate 1877 gates the S$\Delta$A pulses with an output (CLG 1) from Slowdown Interval Generator 1878 to determine the presence of any pulses in the S$\Delta$A signal from the Subtractor 212 during one or more of the clock times C1 7 through C$l$ 16 of the timing cycles. A high signal during any one of the clock times C$l$ 7 through C$l$ 16 would indicate that the difference between the Position Register 204 and the Command Register 200 is 0.032 inch, or greater, so that the carriage should be moving at normal speed. The Slowdown Interval Generator 1878, which is controlled by the 16 Counter 710 as will be explained later, provides a low input to gate 1877 during clock counts C$l$ 1 through C$l$ 6 and a high input during counts C$l$ 7 through C$l$ 16. If the $\Delta$A output of the full subtractor 212 represents in binary code notation the number 32 (0.032 inch) or greater the S$\Delta$A input to nand gate 1877 will include at least one high pulse during the portion of the timing cycle C$l$ 7 through C$l$ 16 that the CLG 1 signal from the Slowdown Interval Generator is high. When the two inputs to gate 1877 are both high, a low input is transmitted to the R-S flip-flop 1879 flipping it to its set condition to provide a high to the reset inhibit input of flip-flop 1880 and a low to the set inhibit. The C$l$ 16 pulse delivered to the set and reset inputs of flip-flop 1880 switches it to its set condition if it has not already been set by a previous timing cycle. The Q output of flip-flop 1880 is therefore high, rendering transistor 1882 conducting, which in turn causes the conduction of transistor 1883 placing low voltage on conductor 1876 to indicate that the carriage should be moving at its normal speed.

As soon as the difference $\Delta$A from the Full Subtractor 212 falls to the number 31 representing that the moving carriage is 0.031 inch from the desired target point, no S$\Delta$A pulses will appear at the input to nand gate 1877 during the time period C$l$ 7 through C$l$ 16 when the CLG 1 signal from the slowdown interval generator 1878 is high. The output of nand gate 1877 therefore remains high and the flip-flop 1879, which had been returned to its reset condition at the beginning of the clock timing cycle by a $\overline{Cl}$ 1 pulse, remains in the reset condition. A high appears at the set inhibit input to flip-flop 1880 so that the next clock 16 pulse changes flip-flop 1880 to its reset position with a low on the Q output. Transistor 1882 is therefore cut off which cuts off transistor 1883 to remove the low from conductor 1876 to the Motor Drive Circuit 218 signalling that the carriage motion should be slowed down to the 1 inch per minute velocity.

If the tape program calls for feed speed numbers, F16, F17, F18 or F19, indicating the desired feed speeds of 120 to 180 inches per minute, carriage movement is caused to be slowed down when it reaches a point 0.127 inch from the desired target position. For the higher feed speed range the Slowdown Interval Generator 1878 generates a CLG 1 signal which is low during clock time C$l$ 1 through C$l$ 8 and is high during clock times C$l$ 9 through C$l$ 16. Thus, if a number 128 or greater is represented in binary code notation in the $\Delta$A signal, an S$\Delta$A pulse will be anded with the high portion of the CLG 1 signal, and through the operation of flip-flops 1879, 1880 and transistors 1882, 1883 a low signal is provided on conductor 1876 to indicate no slowdown to the Motor Drive Circuit 218. As soon as the count of the $\Delta$A signal reaches 127 there is no S$\Delta$A pulse during the high portion of the CLG 1 signal so that transistor 1883 is shut off to signal the slowdown mode for carriage movement. The manner in which the Feed Number Storage Circuit 212 signals the Slowdown Interval Generator 1878 to change the slowdown distance will be discussed hereinafter.

The Reverse Detector Circuit 220 also operates from the difference signal $\Delta$A from the Full Subtractor 212 to indicate the direction of carriage movement to the Motor Drive Circuit 218. As previously indicated in the general description, relative motion of the work tool with respect to the carriage in the positive coordinate direction (plus X for example) is designated by a positive number. Conversely, movement in the negative coordinate direction is indicated by a negative number. It is well known in the digital art that negative numbers may be represented by the complement of the positive number. For example, where positive 5 is designated in binary code notation as 00101, a negative 5 would be indicated by 11010. Thus, whether a binary number is positive or negative may be indicated by the condition of the most significant digit which would be zero for a positive number and a 1 for a negative number, provided, however, that digit is not needed to represent the maximum number to be programmed in the system. Flip-flop 1885 in the reverse detector 220 determines the condition of the most significant digit by reading the condition of the $\Delta$A signal from the Full Subtractor 212 at the clock time C$l$ 16 of the 16 bit clock cycle. If the $\Delta$A signal is low at that time, the reset inhibit of flip-flop 1885 input is low and the set inhibit is high from the output of nand gate 1858, switching it to its reset state, if it hasn't already been done. Its Q output thus goes low to render transistor 1886 non-conductive. Transistor 1887 is also turned off and provides an indicating signal on conductor 1888 to the Motor Drive Circuit 218 to move the carriage in the positive direction.

If the most significant bit of the $\Delta$A signal at clock 16 time is a 1, a high is presented to the reset inhibit and a low is presented to the set inhibit of flip-flop 1885 causing its Q output to go high and transistors 1886 and 1887 to be conductive. A low signal therefore appears on conductor 1888 to signify carriage movement in the negative coordinate direction.

CLOCK CIRCUITS—FIG. 22

The logic timing is provided by the Clock 708 and 16 Counter 710 shown in detail in FIG. 22. The Clock 708 is an ordinary multivibrator type oscillator designed to operate at a frequency of approximately 200 kilocycles per second.

The 16 Counter 710 establishes the 16 count timing cycle used throughout the logic of the system. As previously mentioned it comprises four R-S type flip-flops 2202, 2204, 2206 and 2208 which are connected to switch their condition each time the output of the immediately preceding flip-flop goes to its high state. The first flip-flop 2202 is connected directly to the output of the Clock 708 which controls the pulse length and the period of the timing cycle. Various outputs of the flip-flops are gated by nand gates 2210, 2212, 2214, 2216, 2218 to provide output pulses only during the respective clock times C$l$ 1, C$l$ 2, C$l$ 3, C$l$ 4, C$l$ 16 and $\overline{Cl}$ 16.

The Slowdown Interval Generator 1878 provides the CLG 1 output which controls whether the carriage movement is slowed down 0.031 inch from the target point of 0.127 inch from the target point, dependent upon the programmed feed speed of the carriage movement. If the tape program calls for a low speed, represented by any one of feed rate numbers F1 through F15, the Feed Number Storage Circuit 222, to be described in detail hereinafter, provides a low signal on conductor 2220 to the Slowdown Interval Generator 1878. Negator 2222 converts this to a high at the third input of nand gate 2224. It may be determined that the other two inputs from the flip-flops 2204 and 2206, when anded with the signal from the negator 2222, cause the output of gate 2224 to be high during all clock times except C$l$ 7 and C$l$ 8, which serves as one input to nand gate 2226. The other input for nand gate 2226 is received from flip-flop 2208 which it may be seen is high during clock times C$l$ 1 through C$l$ 8 and low during clock times C$l$ 9 through C$l$ 16. Since both inputs to gate 2226 are high only during clock times C$l$ 1 through C$l$ 6 and one or the other is low during the clock times C$l$ 7 through C$l$ 16 the CLG 1 output to the Slowdown Detector 216 is low during clock times C$l$ 1 through C$l$ 6 and high during clock times C$l$ 7 through C$l$ 16. Thus, the carriage motion is caused to slow down when the distance between the machine carriage and its target point falls below 0.032 inch as hereinbefore described.

When the tape program calls for high carriage velocity represented by feed speed numbers F16 through F19, a high voltage appears on conductor 2220 from the Feed Speed Generator 222 which is inverted by negator 2222 so that gate 2224 always has a low on its third input. Its output is therefore high throughout the 16 count timing cycle. The nand gate 2226 is therefore controlled by its input from flip-flop 2208 which is high during clock times Cl 1 through Cl 8 and low during clock times Cl 9 through Cl 16. Thus, the CLG 1 output signal is low during clock times Cl 1 through Cl 8, and high during clock times Cl 9 through Cl 16. The Slow Down Detector therefore causes the carriage to slow down when the distance between its actual position and the target position falls below 0.128 inch as previously described.

FEED NUMBER STORAGE AND MOTOR DRIVE CIRCUIT—FIG. 19

The Feed Speed Generator 222 translates the tape information relating to the desired feed speed of the machine carriage into signal voltages which cause the Axis Motor Drive 218 to control the velocity of movement of the machine carriage. The feed speed information on the tape is detected by an alpha character F followed by a number from 1 to 19. In the particular embodiment described herein two speed ranges are provided. Feed rate numbers F00 to F09 provide a low speed range of 0.5 tto 11.2 inches per minute, graduated in a square root of two series, and feed rate numbers F11 to F19 provide a high speed range of 8 to 180 inches per minute, also graduated in a square root of two series.

The tens digit of the feed rate number selects a low speed clutch as represented by solenoid 1902 (FIG. 19), or a high speed clutch as represented by solenoid 1904. The units digit provides a signal of proper voltage amplitude by means of Feed Number Storage Circuit 1000 to a Motor Drive Amplifier 1906 for energizing the Axis Motor 104.

The feed rate number from the tape is read into the Feed Number Storage Circuit 1000, which is made up of a bank of silicon controlled switches 1903, 1905 and 1907 through 1916. These SCS's are activated into conduction responsive to the F number on the tape in the following manner.

The Feed Rate Address Detector 1004 detects the alpha character F by the signals on the three-line conductor 418d from the alpha and numeric character decoder 412 in the same manner that the X address detector 704 detected the alpha character X as previously described. Ground voltage is therefore produced on conductor 1917. That signal is anded with a digit 1 pulse and the tape circuit synchronizing pulse P1' which signify the reading of the most significant digit (10s digit) of the feed rate number coded on the tape. Concurrent with the receipt of the P1' pulse on conductor 428, a positive pulse is received on the zero or 1 line of the 10-line conductor 430c from the Numeric Character Decoder 422 which is reading the 10s digit of the feed speed number. All 10 lines of the 10-wire conductor 430c are normally at ground potential when a number is not being detected, and one of the appropriate digit lines goes to a positive potential when that particular number is detected on the tape.

Thus, if the first digit of the feed number is zero, a conduction path is provided for transistor 1918 from 10 volts through conductor 1919, transistor 1918, conductor 1920, resistor 1922, diode 1923 and conductor 1924 to zero volts on the 1 line. Conduction through this circuit places ground at the gate 1925 of SCS 1903 and places positive voltage on the gate 1926 of SCS 1905 by virtue of the voltage drop across resistor 1922. The high voltage on the 0 line of the 10-line conductor 430c prevents the conduction through diode 1927 so that the positive voltage on the gate 1926 of SCS 1905 triggers it to conduction while SCS 1903 remains non-conductive.

When SCS 1905 conducts, a circuit to ground voltage is provided from junction 1939 in the Axis Motor Drive 218 via conductor 1938, diode 1928a, resistor 1928b and SCS 1905. Junction 1940 in the Axis Motor Drive 218 remains at a high positive voltage as it is connected to the anode of the 1 SCS 1908 via conductor 1929, diode 1929a and resistor 1929b. The connection to ground at junction 1939 prepares the Axis Motor Drive 218 so that the low speed solenoid 1902 can be energized and the high speed clutch solenoid 1904 can not be energized responsive to the numeral 0 for the tens digit of the F number in the following manner.

Transistors 1930 and 1931 are normally in a conductive state by means of the positive voltages on their respective bases through the circuit from the 10 volt source through resistor 1932, junction 1933 and the parallel circuits including resistors 1934, 1935, diodes 1937, 1938, junctions 1939, 1940, diodes 1941, 1942 and resistors 1943, 1944 to minus 3 volts. The conduction of SCS 1905 does not turn off transistor 1930, however, because diode 1928a and the respective values of resistors 1932, 1934, 1943 and 1928b maintains its base at positive potential.

Positive voltage remains on the bases of transistors 1930 and 1931 until the voltage on EOB line 440 drops to ground potential responsive to the detection of an End of Block character on tape which signifies that all the program information from the tape has been read into the control system and the machine is ready to perform the program steps. When the EOB signal goes to ground potential the base of transistor 1930 goes negative by the current flow in the circuit from ground conducting SCS 1905, conductor 1928, resistor 1928b, diode 1928a, junction 1939, diode 1941, resistor 1943 and the −3 volt source. Transistor 1931 remains conducting even after the EOB goes low because of the high voltage at junction 1940 from line 1929 connected to the anode of the non-conducting SCS 1903.

The cutoff of transistor 1930 places high voltage through diode 1945 to the input of transistor 1946, causing it to conduct and place positive voltage to the input of transistor 1947 which conducts and energizes the low speed clutch solenoid 1902. Since transistor 1931 remains conductive the input of transistor 1948 remains at ground potential through the collector to emitter circuit of transistor 1931, and transistor 1949 continues to have −3 volts at its input so as to remain cutoff with the high speed clutch 1904 deenergized.

When the tape program calls for a carriage speed in the high range as indicated by a 1 in the most significant digit of the F number on tape, SCS 1903 is triggered to conduction by the high voltage on the 1 line of the 10-line conductor 430c, while SCS 1905 remains non-conducting. Thus, when the EOB signal on conductor 440 goes low, transistor 1930 remains conductive and transistor 1931 is cutoff. Positive voltage is applied to the input of transistor 1948 which in turn triggers transistor 1949 into conduction and energizes the high speed clutch solenoid 1904.

Thus, the most significant digit of the feed rate number on the tape is a coarse speed selection indicator which selects the proper clutch in the drive train between the motor 104 and the machine carriage. The second, or least significant digit, of the feed rate number on tape provides a fine speed selection to cause the motor 104 to run at a selected revolutions per minute in the following manner.

The Motor Drive Amplifier 1906 provides an energizing voltage to the motor 104. While any type of speed adjustable motor may be used, in the embodiment described herein a DC shunt type was selected wherein the magnitude of the input voltage to the armature produces an accurate motor speed. Stabilization of the motor drive is provided in a well known manner by means of a tachometer generator 1950 which feeds back a signal to the motor drive amplifier 1906 in accordance with the speed at which the motor 104 is operating.

The Motor Drive Amplifier 1906 may be of any type which will provide a power output to the motor responsive to the magnitude of the input signal thereto. The reference voltage which determines the speed at which the motor 104 operates, is taken from the arm of a potentiometer 1951 through a Reposition Switch 1952, a Jog Tape Switch 1953 and conductors 1954, 1955, to the Motor Drive Amplifier 1906. The purpose of the Jog Tape Switch 1953 and the Reposition Switch 1952 will be described later.

The reference voltage at the arm of potentiometer 1951 is controlled by the Feed Number Storage Circuit 1000 which serves to connect the lower end of the potentiometer 1951 to ground through one or more of the voltage divider resistors 1956 through 1964. The junction between each of the voltage divider resistors is connected to the conducting anode of the SCS's 1907 through 1916, the cathodes of which are connected to ground by conductor 1967. The gate electrodes of each of the SCS's 1907 through 1916 are connected to one of the 10 lines of the 10-wire conductor 430c from the numeric character decoder 422. Each of the lines of the 10 line conductor represents a number 0 through 9 so that the proper number of resistors 1956 through 1964 is selected responsive to the least significant digit of the 2-digit feed rate number on the tape. The gate electrodes are enabled by a digit 2 pulse on line 427d from the digit register 426 to signify the read in of the least significant digit of the feed rate number in the same manner that the digit 1 pulse enabled the gate electrodes of SCS's 1903 and 1905. That is, when the voltage on the digit 2 line 427d drops to a low voltage signifying the read in of the least significant digit of the Feed Speed number, transistor 1965 conducts to place 10 volts on conductor 1966. That voltage is anded with the high voltage on the selected one of the 0–9 number lines of the 10 line conductor 430c to select the respective SCS 1907 through 1916. For example, if the least significant digit of the feed rate number is 7, the high voltage on the digit 7 conductor is anded with the high voltage on conductor 1966 to trigger SCS 1914 into conduction and place the junction between resistors 1962 and 1963 at ground potential. The speed voltage on the arm of potentiometer 1951 is therefore determined by the voltage drops in the circuit from the speed reference voltage through the potentiometer 1951, resistor 1964, resistor 1963, conductor 1968, the anode to cathode circuit of SCS 1914 and conductor 1967, to ground.

It can thus be seen that the voltage at the arm of potentiometer 1951, and, hence, at the input to the Motor Drive Amplifier 1906 is inversely proportional to the least significant digit of the 2-digit feed rate number. That is, if the second digit of the feed rate number is zero, maximum voltage appears at the arm of potentiometer 1951 and if the second digit of the feed rate number is 9, minimum voltage is present at the arm of potentiometer 1951. The Motor Drive Amplifier 1906 energizes the motor 104 to operate at a particular speed responsive to these voltage differences.

The potentiometer 1951 from which the speed reference voltage is taken permits operator control of the carriage speed in spite of the programmed value on the tape. The potentiometer permits the operator to vary the speed from 0 to 120 percent of the programmed value merely by changing the position of the potentiometer arm.

As previously mentioned, the control system includes provisions for slowing down the carriage movement when the carriage reaches a predetermined point from the desired position programmed on the tape to prevent overshoot because of the inertia of the carriage. This is accomplished by pulling in the low speed clutch if it is not already in, and by providing an increased voltage to the Motor Drive Amplifier 1906. When the slow down point is reached a high going signal is received by the Motor Drive Circuit 218 on line 1876 from the Slow Down Detector 216. Transistor 1970 is thus turned on and approximately 20 volts is applied directly to the input of the Motor Drive Amplifier 1906 to override the speed reference voltage from potentiometer 1951 via the circuit from 24 volts through transistor 1970, diode 1971, conductor 1972 and conductor 1955 to the Motor Drive Amplifier. The high voltage appearing at the emitter of transistor 1970 also serves to turn on transistor 1974, which grounds the input of transistor 1948 in the circuit for the high speed clutch solenoid 1904 causing it to become deenergized if it had been previously selected. Also, the high voltage at the emitter of transistor 1970 is applied through conductor 1978, resistor 1980 and diode 1981 to the input of transistor 1946 in the low speed clutch circuit so that that clutch is energized if it was not previously selected. The high voltage to the Motor Drive Amplifier 1906, plus the selection of the low speed clutch, as well as operation of the Dynamic Brake 1020, causes the carriage speed to slow down to approximately 1 inch per minute, regardless of the feed rate that had been programmed in previously.

The carriage is caused to stop when it reaches the desired target position programmed on tape by a high going signal received by the Motor Axis Drive 218 on line 1873 from the Start-Stop Detector 214. The high going stop signal back biases diodes 1983 and 1984 so that positive voltage is applied to the inputs of transistors 1946 and 1948 in the low speed clutch and high speed clutch circuits. Both transistors 1946 and 1948 are rendered conductive if either one hadn't already been energized by the tape program, and the respective power transistors 1947, 1949 are also turned on so that both clutches 1902 and 1904 are energized. The clutches are arranged such that when both are energized they serve as a brake.

As described earlier provisions are made to cause the carriage movement to slow down at a greater distance from the target point when it is moving at a feed rate speed designated by feed rate numbers F16, F17, F18 or F19 than when operating at a feed rate designated by feed numbers F01 through F15. These numbers represent the highest feed rate speeds and greater distance must be given for the slowdown because of the momentum of the machine carriage. The Feed Rate numbers F16 through F19 are detected by the Slow Down Interval Change Circuit 1985 which sends a signal to the Slow Down Interval Generator 1878 initiating the earlier slow down.

If the 10s digit of the feed rate number is a 1, conductor 1987 from the conducting anode of SCS 1903 goes low when the 1 line of the 10-line conductor 430c is pulsed. When the voltage on conductor 1987 goes low, transistor 1988 goes from a normally conducting state to a non-conducting state. If the least significant digit of the feed rate number is any one of the digits 6 through 9 the normally conducting transistor 1989 is also cut-off by the following action. A number 6 through 9 as the least significant digit of the feed speed number causes one of the SCS's 1913 through 1916 to conduct. When one of them is energized ground voltage is placed on the respective conductor 1990 through 1993. The And circuit 1994 removes positive voltage from the input of transistor 1989 when any one of the conductors 1990 through 1993 goes low, thus switching it off. Conductor 2220 from the collectors of the transistors 1988, 1989 goes high when they both turn off indicating to the Slowdown Interval Generator 1878 in the Slowdown Detector 216 that the carriage must be slowed down at a point further from the desired target position than is called for by a speed represented by Feed Rate number F01 through F15.

Once the silicon controlled switches 1903, 1905 and 1907 through 1916 have been turned on responsive to the programmed feed speed F number, they remain on throughout the program until, and unless, a new feed rate number appears on a subsequent program step. If so, the F address detector 1004 detects the alpha character F and causes all of the silicon controlled switches to be turned off in preparation for receipt and storage of the new feed rate number. To accomplish this, the F address detector 1004 causes the 24-volt supply on conductor 1998 leading to the conducting anodes of the 10s digit SCS's 1903 and 1905 to momentarily drop to zero, thus turning them off. The 1s digit SCS's 1907 through 1916 are turned off responsive to the F address detector 1004 detecting the new feed speed number by causing the speed reference voltage connected to the potentiometer 1951 to momentarily drop to ground potential thus dropping the voltage on the conducting anodes of the SCS's 1907 through 1916. The particular circuit for reducing the 24 voltage to the 10s digit SCS's and the speed reference voltage for the 1s digit SCS's is not shown in detail because it does not form a part of this invention. However, it may be any simple circuit which will temporarily interrupt the voltage responsive to the detection of the character F on tape.

TAPE CONTROL OPERATION—FIG. 20

The various circuits and apparatus for the tape control system for the milling machine have been described in the paragraphs hereinabove. A general description of the operating procedures and their relationship to the various circuits of the control system will now be given.

A punched tape program conforming to EIA Standard RS 244 character code is prepared on an ordinary punch tape typewriter such as a Friden Flexowriter. The tape is prepared with all the program steps including the coordinate positions, the feed speeds, tools to be used, etc., in accordance with a process sheet information such as shown in FIGS. 3 and 3a.

When it is desired to cut a workpiece responsive to the tape program, the power for the control system is turned on by depressing the power switch 2008 on the control panel 2002 of the control console. The Jog-Tape switch 1953 is turned to its manual high speed position and the carriage is "jogged" to a zero reference position which has preferably been scribed on the workpiece blank. The machine carriage is moved to the desired zero reference position by positioning the Jog Direction Switch 2010 to the required direction for carriage movement towards the zero reference point and depressing the X-Y Jog button 2012 to actuate the Axis Drive Motors 104 and cause the carriage to be moved at a speed indicated by the Manual Speed elector 2013. The detailed circuits for "jogging" Selector the carriage position are now shown in the drawings and they do not form a part of the invention as claimed herein. Briefly, however, the Jog Direction Switch selects one or both of the X and Y Axis Drive Motors 104 and also selects the direction of operation of each of the motors. The X-Y Jog button 2012 then completes the power circuit to the motor, or motors selected. The carriage is finally adjusted to the desired reference zero point with respect to the work tool 109 by means of the carriage hand wheels 116, 118 (FIG. 1) of the milling machine. The electrical reference zero is then set to the table reference zero position by the et Reference Zero switch 2005. By turning the switch 2004 first to the X position, the X Position Register 204 is cleared to all zeros in all 16 stages. Turning switch 2005 to the Y position then clears the Y Position Register 204a to all zeros. The emergency Stop button 2014 is then depressed to prevent further movement of the carriage while the tape is loaded into the control.

The beginning of the tape is threaded through the tape reader 410. The Tape Forward Reverse switch 608 (FIG. 6) located on the tape reader 410 is switched to the forward position which causes the tape to advance until the first EOB character is detected. The tape program is now ready to start.

If the milling machine is being used in its straight line and positioning mode to cut a pattern in the workpiece, the size of the work tool is compensated for by reading into the Tool Offset Thumb switches 2000 the radius of the tool, in 1,000ths of an inch. The Emergency Stop switch 2014 is again depressed to release the carriage for movement. The system is now ready to perform the tape program.

The program is initiated by operating the Start-Stop switch 2004. The tape advances to the first character in the program, which is the sequence number as designated by the character N on the tape. The sequence number is read from the tape and caused to be displayed on the digit display indicators 604a, 604b, 604c. The G function is next read which indicates the direction of tool offset compensation for the particular process sequence step. The G number sets the Tape Data Converter and Arithmetic Control 700 to add or subtract the tool offset dimension read into the Tool Offset Thumb Wheel switches 2000. Next, the coordinate axis information, indicating the desired target point dimension, is read from the tape into the Tape Data Converter and Arithmetic Control 700 where it is combined with the tool offset information digit by digit as it is read from the tape in sequence from the most significant digits of the tape and tool offset dimensions to the least significant digits.

After the tape and tool offset information have been read into the Tape Data Converter and Arithmetic Control Circuit 700, the data relating to the tool offset compensated target position is circulating through the X and/or Y Command Registers 200, 200a.

The feed rate number which dictates the speed of the carriage with respect to the work tool is next programmed into the control system. This information is stored in the X and Y Feed Speed Generator 222 and prepares for the movement of the carriage after all of the sequence step information has been read into the system.

Other information such as the desired tool number, or other auxiliary functions, are also read into the control if they appear on the tape and are displayed on the control panel. If the program step calls for no operator function such as changing, plunging or lifting the work tool, the tape advances to the EOB character on the tape which stops the tape drive and actuates the machine to operate in accordance with the data programmed into the system.

The carriage then begins to move towards the tool offset compensated target position. Data relating to the actual position of the carriage with respect to the zero reference position is read into the Axis Position Register 204 by the Pulse Wheel 206 as the carriage moves. The actual position data in the Axis Position Register 204 is compared with the compensated target position data in the Axis Command Register 200, and, as long as there is a difference therebetween the carriage is kept moving. When the carriage reaches a predetermined distance in front of the compensated target position, the Slowdown Detector 216 in the Axis Logic Control circuit 1006 causes the carriage movement to be retarded to a predetermined low velocity until the compensated target position is reached. The Stop-Start Detector 214 in the Axis Logic Control circuit 1006 then signals the Motor Drive circuits to stop the carriage movement.

The arrival of the carriage at its compensated target position is detected by the Axis On Position Detector 442 in the Character Decoder and Timing Control Circuit 400 which reactivates the Tape Drive circuit to move the tape to the next programmed sequence step. The system continues automatically to read in the tape and tool offset information, and perform the indicated machine operation until the end of the program or until the program calls for an operator function to be performed.

To change the work tool during the program sequence when called for between sequence steps, it is usually necessary that the carriage be moved so that the workpiece is away from the work tool to facilitate its removal and replacement. The carriage is moved to a desirable position by use of the Jog Direction control 2010 and the X-Y Jog button 2012. After the tool has been removed, the carriage is easily returned to its last tape position merely by operating the Reposition switch 1952 to the tape position. When the carriage was jogged to the new position the data in the Position Register 204 was, of course, changed to reflect the change in position. The tape position of the Reposition Switch 1952 places ground on the EOB Start Conductor 440 via line 1952a and diode 1952b to enable the control to compare the new Position Register data with tape data in the Command Register 200 and cause the carriage to be driven back to the position dictated by the tape data in the Command Register.

The reference zero position of the Reposition Switch 1952 permits the easy relocation of the carriage to the reference zero position. When the Reposition Switch is turned to the reference zero position it causes all zeros to be read into the Command Registers 200 and 200a. The zeros in the Command Registers are compared with the actual position information in the Position Registers 204, 204a to provide a signal to the Motor Drive Circuits and cause the carriage to be moved to the zero reference position. The zeros are read into the Command Registers by means of conductor 1745 (FIG. 17) leading from the Reposition Switch to the input of nand gate 1744 in the Coordinate Selector Gate 732 of the Tape Data Converter and Arithmetic Control 700. Ground voltage on line 1745 causes all of the stages of the Command Registers to be set to their zero states.

As may be seen on the drawing of the control panel 2002 (FIG. 20) provisions are also made for reading information into the control system by manual means without the use of the tape input. The desired position in the X and Y coordinate axes may be dialed in on the thumb wheel switches 2018 with the appropriate coordinate axis selected by buttons 2020, 2022. The appropriate tool offset direction information as well as the feed rate number, tool number and miscellaneous function numbers may be inserted by means of the thumb wheel switches 2024 and the appropriate function buttons 2026 through 2029. The amount of tool offset is again read in on the tool offset thumb wheel switches 2000.

The control panel also includes provisions for Z axis operation if desired. The Z coordinate relates to the relative distance between the carriage and the work tool in a vertical direction. While the circuits described in this specification have referred only to the X and Y coordinate axes, it is obvious that a Z axis control could be easily added using fundamentally the same circuits as hereinbefore described for the X and Y coordinate axes.

While there has been described herein a preferred embodiment which has been built and operated by the inventors, it is to be understood that modifications and improvements might be made thereto while retaining the teachings of this invention. It is therefore intended that the scope of the invention be limited only by the appended claims.

What is claimed is:

1. For use with a machine having a tool, a workpiece support, and driving means to provide relative movement between said tool and said workpiece support, a control system for said driving means comprising input means for representing a tool offset measurement in BCD code notation, input means for representing a desired relative end position measurement from a reference position in BCD code notation signals and for representing the desired direction of tool offset, means for arithmetically combining said input signals by adding or subtracting in accordance with the tool offset desired direction to provide a tool offset compensated end position signal, means for sequencing said combining means to combine respective significant digits of said BCD input code signals in sequential order, means for comparing said combined signals with the relative position of said tool and workpiece to cause said drive means to provide relative movement to the tool offset compensated end position, said sequencing means causing said combining means to combine the respective significant digits in sequential order from the most significant digit to the least significant digit; and wherein said combining means comprises a multi-bit shift register having a sufficient number of shift stages to store the tool offset and end position measurements in straight binary code notation, a multiplier connected to the output of said shift register having a times two and a times eight output and a two channel input full adder-subtractor circuit having its output connected to the inputs of said shift register; and wherein said sequencing means comprises a first gate for connecting the output of said shift register to one input of said adder, second and third gates for connecting each of said multiplier outputs to a respective one of said adder-subtractor inputs, fourth and fifth gates for connecting each of said measurement inputs to the other input of said adder, and an arithmetic cycle sequencer operative responsive to the input of each significant digit of said BCD code signals to sequentially:
   1. control the opening of said second and third gates to multiply the contents of said register by ten,
   2. control the opening of said first and fourth gates to arithmetically combine the respective digit of one of said BCD measurement input signals with the contents of said register; and
   3. control the opening of said first and fifth gates to arithmetically combine the respective digit of the other of said BCD measurement input signals with the contents of said register.

2. The control system of claim 1 wherein said comparing means comprises means for representing the relative positions of said tool and workpiece support in straight binary code notation signals and a full subtractor for comparing said position signals with the combined measurement signals, said driving means being responsive to the output of said subtractor to cause movement to the tool offset compensated end.

3. The control system of claim 2 wherein said driving means comprises separate motors for providing relative motion in at least two respectively perpendicular directions; and wherein said combining means comprises a second shift register, each register being associated with one of said directions and means for selecting at least one of said registers in accordance with the direction of travel to the compensated end position.

4. In combination with a machine having a tool, a workpiece support and driving means for providing relative movement between said tool and workpiece support, a control system for said driving means comprising input means for representing a tool offset measurement in BCD code notation signals, input means for representing a desired relative end position measurement from a reference position in BCD code notation signals and for representing the desired direction of tool offset, means for arithmetically combining said input signals by adding or subtracting in accordance with the desired direction of tool offset to provide a tool offset compensated end position signal, means for sequencing said combining means to combine respective significant digits of said BCD input code signal in sequential order, means for comparing said combined signals with the relative position of said tool and workpiece to cause said drive means to provide relative movement to the tool offset compensated end position, said sequencing means causing said combining means to combine the respective significant digits in sequential order from the most significant digit to the least significant digit; and wherein said combining means comprises a multi-bit shift register having a sufficient number of shift stages to store the tool offset and end position measurements in straight binary code notation, a multiplier connected to the output of said shift register having a times 2 and a times 8 output, and a two channel input full adder-subtractor circuit having its output connected to the inputs of said shift register; and wherein said sequencing means comprises a first gate for connecting the output of said shift register to one input of said adder, second and third gates for connecting each of said multiplier outputs to a respective one of said adder-subtractor inputs, fourth and fifth gates for connecting each of said measurement inputs to the other input of said adder-subtractor, and an arithmetic cycle sequencer operative responsive to the input of each significant digit of said BCD code signals to sequentially:
   1. control the opening of said second and third gates to multiply the contents of said register by 10,
   2. control the opening of said first and fourth gates to arithmetically combine the respective digit of one of said BCD measurement input signals with the contents of said register; and
   3. control the opening of said first and fifth gates to arithmetically combine the respective digit of the other of said BCD measurement input signals with the contents of said register.

5. The combination of claim 4 wherein said end position measurement and tool offset direction inputs comprise a punched tape reader and said tool offset measurement input comprises a manually controllable device.

6. For use with a machine having a tool, a workpiece support, and driving means to provide relative movement between said tool and said workpiece support, a control system for said driving means comprising input means for representing the actual tool size offset measurement in BCD code notation signals, input means for representing a desired relative end position measurement of said tool and workpiece from a reference position in BCD code notation signals and for representing the desired direction of tool size offset, means for arithmetically combining said input measurement signals, means for causing said combining means to add or subtract said input measurement signals in accordance with the tool size offset desired direction to provide a tool size offset compensated end position signal, means for sequencing said combining means to combine respective significant digits of said BCD input code signals in sequential order, means for comparing said combined signals with the relative position measurement of said tool and workpiece from said reference position to cause said drive means to provide relative movement to the tool offset compensated end position, said sequencing means causing said combining means to combine the respective significant digits in sequential order from the most significant digit to the least significant digit; and wherein said combining means comprises a multi-bit shift register having a sufficient number of shift stages to store the tool size offset and end position measurements in straight binary code notation, a times 10 multiplier connected to the output of said shift register having output means and a two channel input full adder-subtractor circuit having its output connected to the inputs of said shift register; and wherein said sequencing means comprises first gate means for connecting the output of said shift register to one input of said adder, second gate means for connecting said multiplier output means to said adder-subtractor inputs, third and fourth gate means for connecting each of said measurement inputs to the other input of said adder, and an arithmetic cycle sequencer operative responsive to the input of each significant digit of said BCD code signals to sequentially:
1. control the opening of said second gate means to multiply the contents of said register by 10,
2. control the opening of said first and third gate means to arithmetically combine the respective digit of one of said BCD measurement input signals with the contents of said register, and
3. control the opening of said first and fourth gate means to arithmetically combine the respective digit of the other of said BCD measurement input signals with the contents of said register.

7. The control system of claim 6 wherein said comparing means comprises means for representing the relative positions of said tool and workpiece support in straight binary code notation signals and a full subtractor for comparing said position signals with the combined measurement signals, said driving means being responsive to the output of said subtractor to cause movement to the tool offset compensated end position.

8. The control system of claim 7 wherein said driving means comprises separate motors for providing relative motion in at least two respectively perpendicular directions; and wherein said combining means comprises a second shift register, each register being associated with one of said directions and means for selecting at least one of said registers in accordance with the direction of travel to the compensated end position.

9. For use with a machine having a tool rotatable about an axis, a workpiece support and driving means for providing relative movement between said tool and workpiece support, a control system for said driving means comprising input means for representing the radius of rotation measurement of said tool in BCD code notation signals, input means for representing a desired relative end position measurement of the tool axis from a reference position in BCD code notation signals and for representing the desired direction of tool radius offset, means for arithmetically combining said input measurement signals, means for causing said combining means to add or subtract said input measurement signals in accordance with the desired direction of tool radius offset to provide a tool radius offset compensated end position signal, means for sequencing said combining means to combine respective significant digits of said BCD input code signals in sequential order, means for comparing said combined signals with the relative position of said tool and workpiece to cause said drive means to provide relative movement to the tool offset compensated end position, said sequencing means causing said combining means to combine the respective significant digits in sequential order from the most significant digit to the least significant digit; and wherein said combining means comprises a multi-bit shift register having a sufficient number of shift stages to store the tool offset and end position measurements in straight binary code notation, a multiplier connected to the output of said shift register having a times 2 and a times 8 output, and a two channel input full adder-subtractor circuit having its output connected to the inputs of said shift register; and wherein said sequencing means comprises a first gate for connecting the output of said shift register to one input of said adder, second and third gates for connecting each of said multiplier outputs to a respective one of said adder-subtractor inputs, fourth and fifth gates for connecting each of said measurement inputs to the other input of said adder-subtractor, and an arithmetic cycle sequencer operative responsive to the input of each significant digit of said BCD code signals to sequentially;
1. control the opening of said second and third gates to multiply the contents of said register by 10,
2. control the opening of said first and fourth gates to arithmetically combine the respective digit of one of said BCD measurement input signals with the contents of said register, and
3. control the opening of said first and fifth gates to arithmetically combine the respective digit of the other of said BCD measurement input signals with the contents of said register.

10. The combination of claim 9 wherein said end position measurement and tool offset direction inputs comprise a punched tape reader and said tool offset measurement input comprises a manually controllable device.

11. For use with a machine having a tool, workpiece support, and driving means to provide relative movement between said tool and workpiece support comprising means for arithmetically combining data inputs, means including a manual control for entering data relating to the actual amount plus or minus of work tool size offset required into said combining means, a prepared program input, means for entering data into said arithmetic combining means from said prepared program input relating to the actual desired dimension of the workpiece and to the required direction of tool size offset, means responsive to the entry of data relating to said required direction of tool size offset to cause said arithmetic combining means to add or subtract said data in accordance with the required direction of the tool size offset, and means responsive to said arithmetic combining means for causing said driving means to provide relative movement between said work tool and workpiece support in accordance with the desired dimension.

* * * * *